(12) United States Patent
Powell-Palm et al.

(10) Patent No.: US 12,270,601 B2
(45) Date of Patent: Apr. 8, 2025

(54) DEVICES AND METHODS FOR HIGH-STABILITY SUPERCOOLING OF AQUEOUS MEDIA AND BIOLOGICAL MATTER

(71) Applicant: The Regents of the University of California, Oakland, CA (US)

(72) Inventors: Matthew J. Powell-Palm, Berkeley, CA (US); Boris Rubinsky, Berkeley, CA (US)

(73) Assignee: The Regents of the University of California, Oakland, CA (US)

(*) Notice: Subject to any disclaimer, the term of this patent is extended or adjusted under 35 U.S.C. 154(b) by 355 days.

(21) Appl. No.: 17/845,114

(22) Filed: Jun. 21, 2022

(65) Prior Publication Data

US 2022/0325937 A1  Oct. 13, 2022

Related U.S. Application Data

(63) Continuation of application No. PCT/US2021/012863, filed on Jan. 9, 2021.

(60) Provisional application No. 62/960,524, filed on Jan. 13, 2020.

(51) Int. Cl.
F25D 3/08 (2006.01)

(52) U.S. Cl.
CPC .......... *F25D 3/08* (2013.01); *F25D 2303/084* (2013.01); *F25D 2331/8014* (2013.01); *F25D 2700/00* (2013.01)

(58) Field of Classification Search
CPC ................ F25D 3/08; F25D 2303/084; F25D 2331/8014; F25D 2700/00; Y02E 60/14; A01N 1/0242; A01N 1/0284; A01N 1/0289; A23L 3/362
See application file for complete search history.

(56) References Cited

U.S. PATENT DOCUMENTS

| | | | |
|---|---|---|---|
| 2003/0078672 A1 | 4/2003 | Shapiro et al. | |
| 2007/0042337 A1* | 2/2007 | Rubinsky et al. | ... A01N 1/0221 435/1.1 |
| 2009/0011505 A1* | 1/2009 | Leunissen et al. | .. A01N 1/0289 435/374 |

(Continued)

FOREIGN PATENT DOCUMENTS

| | | | |
|---|---|---|---|
| WO | 1992/012722 A1 | 8/1992 | |
| WO | WO 2009038424 A2 * | 3/2009 | ............. F25D 25/00 |

(Continued)

OTHER PUBLICATIONS

WO 2009038424 A2 Translation (Year: 2009).*

(Continued)

*Primary Examiner* — Elizabeth J Martin
*Assistant Examiner* — Dario Antonio Deleon
(74) *Attorney, Agent, or Firm* — Richard Aron Osman

(57) ABSTRACT

Supercooled water or solutions can be destabilized by the nucleation of ice. Constraining water in a constant-volume (isochoric) container minimizes destabilization through thermodynamic, kinetic, and fluid dynamic means, significantly enhancing supercooling stability. Methods and devices are used for stable and transportable supercooling of aqueous solutions or suspensions, and the stable and long-term preservation of biological matter that may be stored therein.

20 Claims, 13 Drawing Sheets

Isobaric

T-P

Isochoric

T-V

(56) References Cited

U.S. PATENT DOCUMENTS

| | | | |
|---|---|---|---|
| 2009/0188260 A1* | 7/2009 | Saho et al. | F25D 19/006 62/3.6 |
| 2011/0167836 A1 | 7/2011 | Zorovich et al. | |
| 2015/0087056 A1* | 3/2015 | Pelle et al. | A01N 1/0284 435/366 |
| 2017/0290741 A1* | 10/2017 | Chou et al. | F25D 3/08 |
| 2018/0064100 A1* | 3/2018 | Morris et al. | A01N 1/0268 |
| 2020/0229427 A1* | 7/2020 | Kilbride et al. | A01N 1/0284 |
| 2020/0317423 A1* | 10/2020 | Knight | F25D 3/08 |
| 2021/0000104 A1* | 1/2021 | Kukal et al. | A01N 1/0284 |
| 2021/0156621 A1* | 5/2021 | Blanc et al. | Y02E 60/14 |
| 2021/0195891 A1* | 7/2021 | Uygun et al. | A01N 1/0247 |

FOREIGN PATENT DOCUMENTS

| | | |
|---|---|---|
| WO | 2014/162910 A1 | 10/2014 |
| WO | 2016/158479 A1 | 10/2016 |
| WO | 2019/032889 A1 | 2/2019 |

OTHER PUBLICATIONS

Preciado J A et al: "Isochoric preservation: A novel characterization method", Cryobiology, vol. 60, No. 1, Feb. 2010, pp. 23-29, XP026944172.

Extended European Search Report, Jun. 6, 2023.

Examination Report, Jun. 27, 2023, CA App No. 3,165,835.

International Search Report, Written Opinion, May 19, 2021, PCT/US21/12863.

Powell-Palm M. J. et al., "Isochoric conditions enable high sub-freezing temperature 4-5. 7, 24 pancreatic islet preservation without osmotic cryoprotective agents", Cryobiology, 2019, vol. 86, pp. 130-133; retrieved from the Internet:< DOI: 10.1016/j.cryobiol.2019.01.003 >.

Mikus et al. The nematode Caenohabditis elegans survives sub-freezing temperatures in an isochoric system, Biochem Biophys Res Comm 477 (2016) 401-5.

* cited by examiner

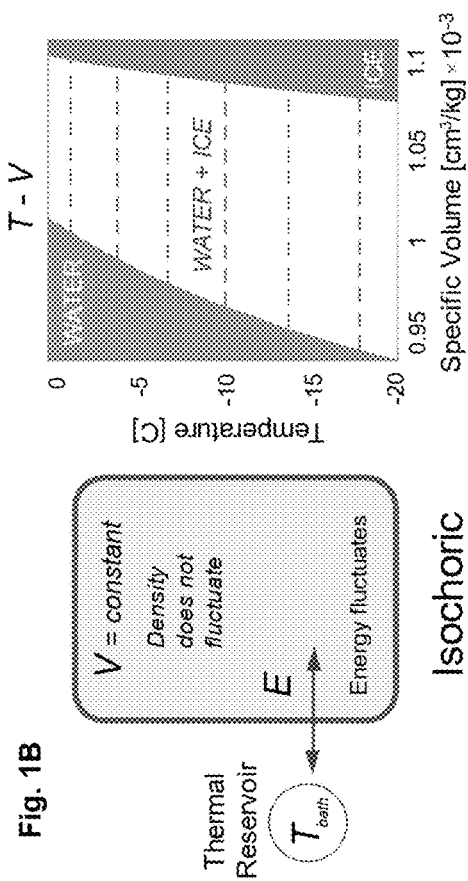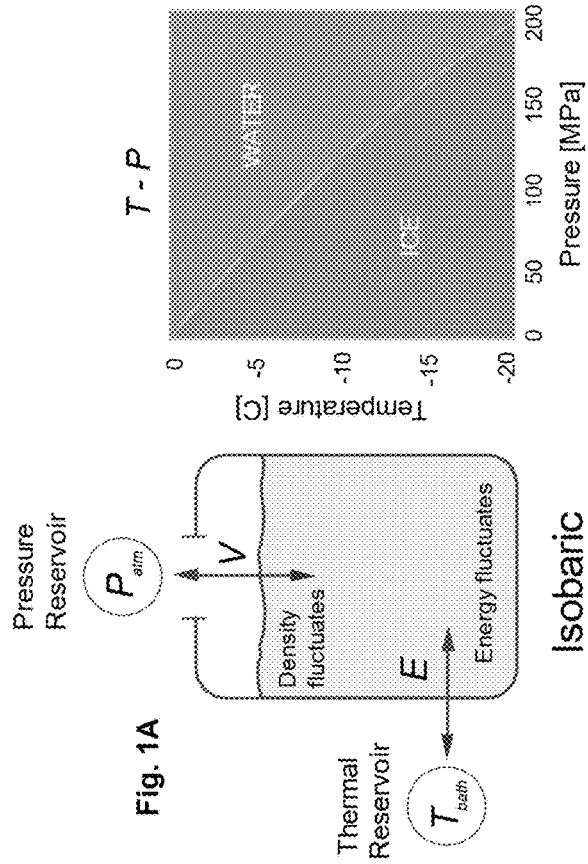
Fig. 1A
Fig. 1B

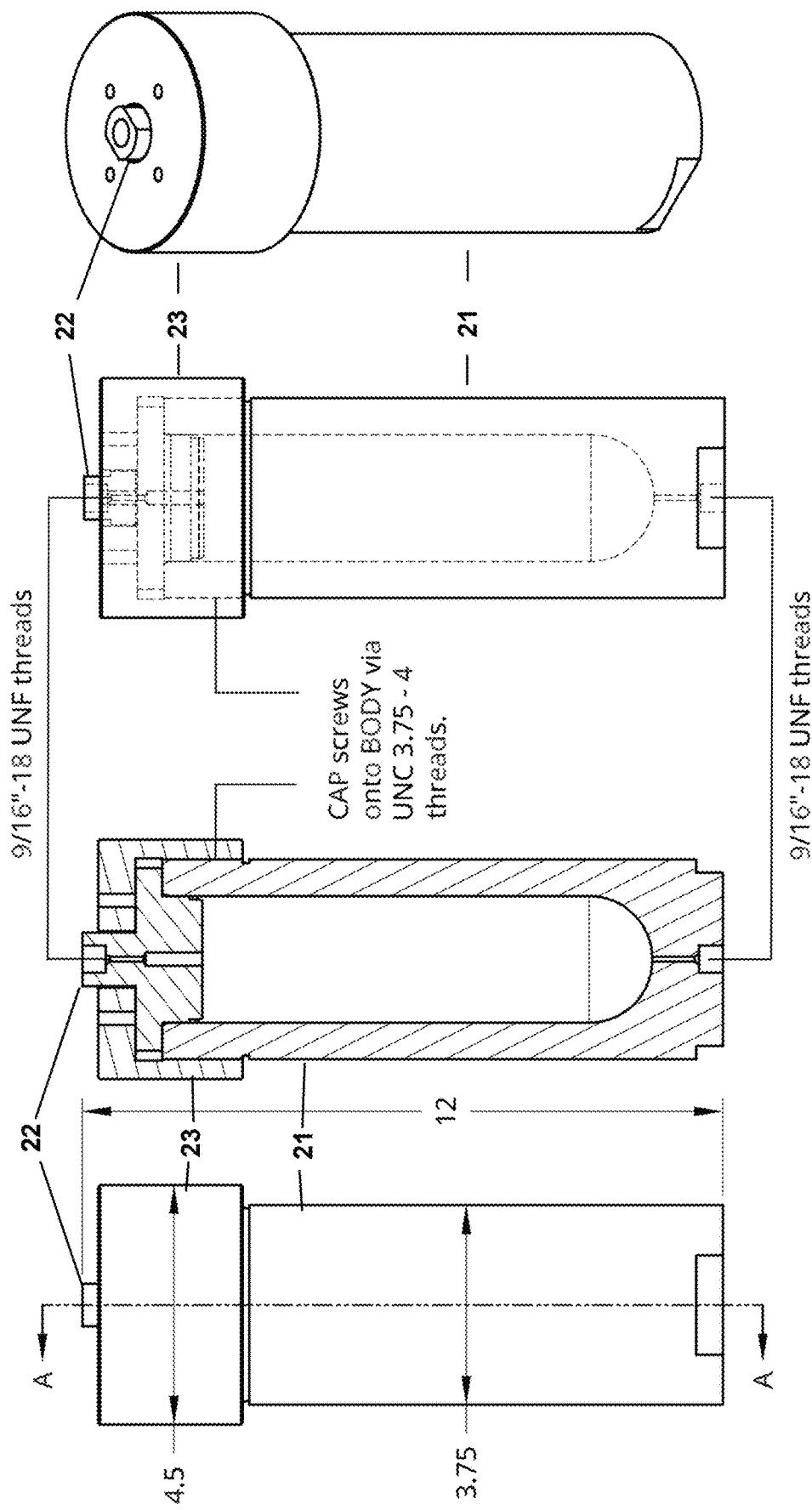

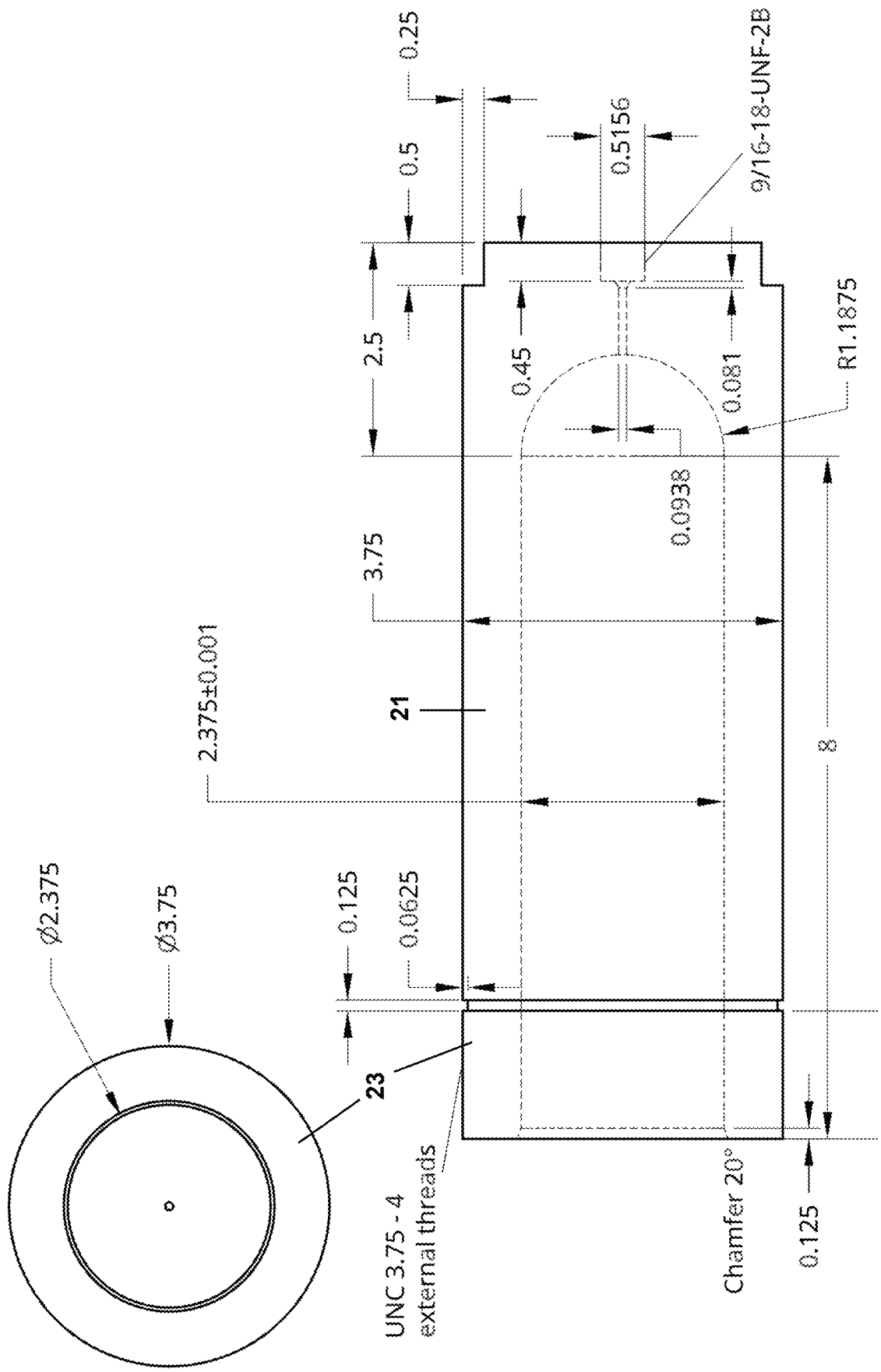

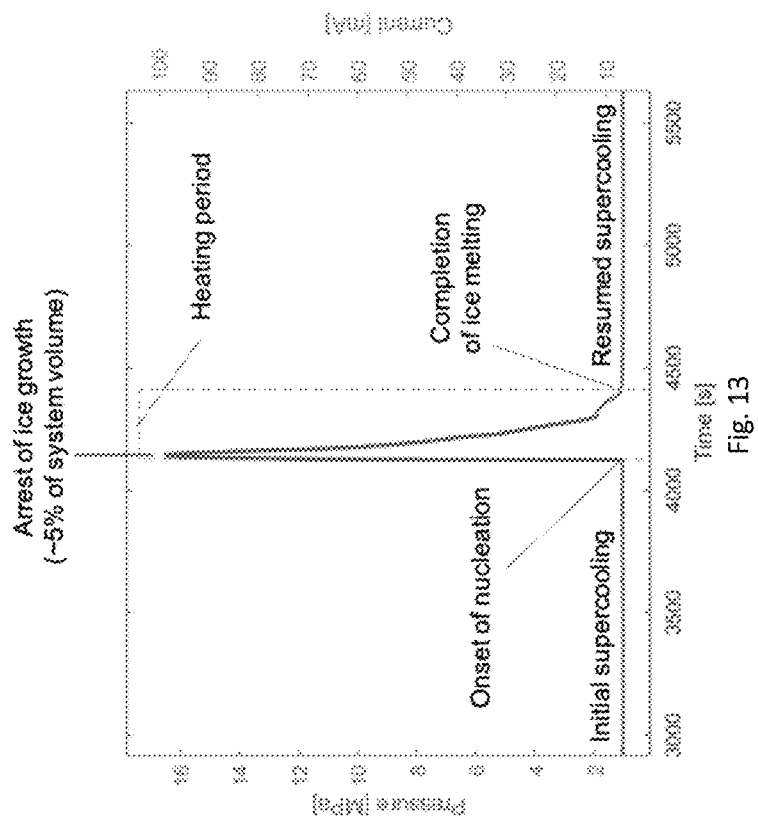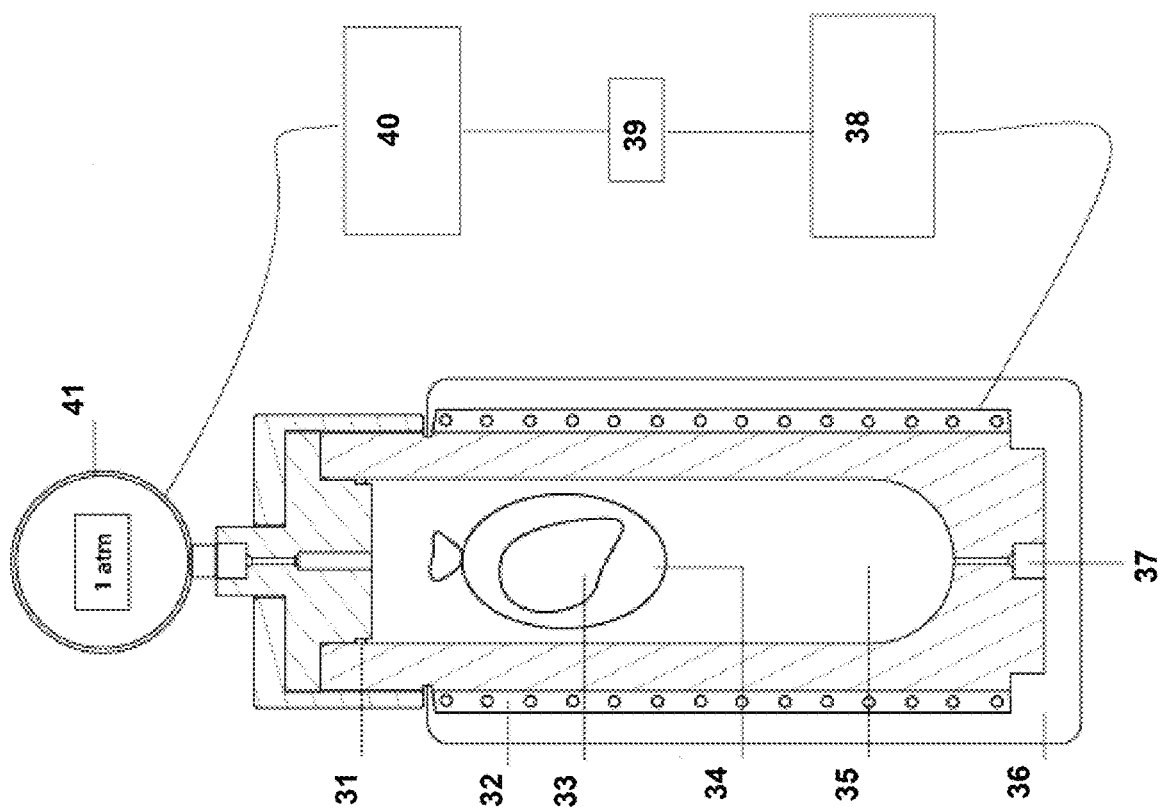

DEVICES AND METHODS FOR HIGH-STABILITY SUPERCOOLING OF AQUEOUS MEDIA AND BIOLOGICAL MATTER

This invention was made with government support under Grant Number 2018-67017-27826 awarded by the USDA National Institute of Food and Agriculture. The government has certain rights in the invention.

INTRODUCTION

A liquid such as water is considered to be thermodynamically "supercooled" when it is brought to a temperature beneath its equilibrium freezing point but remains in a liquid state. This process is extremely useful in the medical field, enabling long-term preservation of sensitive biological materials such as tissues and organs by reducing their temperature and arresting their metabolism while simultaneously protecting them from damaging ice formation. However, supercooling is a thermodynamically metastable process; a liquid in a supercooled state may destabilize and convert to its solid state (e.g. it may freeze) upon even mild agitation of the system, or due to spontaneous processes [1]. Thus, supercooling techniques are currently limited to use in extremely controlled and stationary laboratory environments. New methods and devices for enhancing the stability of supercooling are required in order to make supercooled systems transportable, reliable for long term storage, and clinically relevant.

Disruption of the metastable supercooled state and the ensuing ice nucleation can be caused by a variety of factors, including mechanical or vibrational stimulation [2], ultrasonic stimulation [3-5], random thermal microscopic density fluctuations [6], fluid-fluid interface instabilities, heterogeneous interaction with solid surfaces or gaseous interfaces [6,7], and cavitation of gas bubbles within the liquid [4, 8, 9]. Thus, in order to maximize the stability of a supercooled systems, devices and methods must be developed which simultaneously combat all of these methods of destabilization.

The majority of past technological efforts aiming to increase the stability of supercooled water have addressed only one of these destabilization mechanisms, surface/interfacial interactions between the water and its surroundings. For example, Usta et al. developed a method of sealing the free surface of supercooled water with an immiscible liquid such as an oil, which they claim reduces the likelihood of nucleation by removing air as a heterogeneous nucleation site (Usta et al., International Patent Application Number PCT/US20 19/0 16346). Similarly, Aizenberg et al. has developed a variety of porous surface coatings impregnated with hydrophobic liquids (typically perfluorinated substances) in order to reduce heterogeneous ice nucleation on container surfaces (Aizenberg et al., U.S. Pat. No. 9,932, 484). Two notable exceptions to these surface/interfacial efforts are reported in the literature. One includes an attempt to enhance supercooling through the use of magnetic or electric fields (Jun et al., U.S. Pat. No. 10,111,452). The second employs constant volume systems to reduce the probability of random ice nucleation (Rubinsky et al., U.S. patent application Ser. No. 11/485,922). However, while all of the referenced works attempt to reduce the likelihood of ice nucleation, none of these studies specifically address the myriad mechanisms of destabilization associated with transportation and long term clinical use, including mechanical stimulation, ultrasonic stimulation, cavitation, fluid-fluid interface instabilities, increased probability for density-fluctuations, etc. For supercooling to become a practical method for preservation, these aspects cannot be ignored.

In the present disclosure, the inventors present methods and devices based on newly realized thermodynamic, kinetic, and fluid dynamic phenomena to dramatically enhance the long term stability of supercooled systems exposed to a wide variety of external agitations, including vibration, acute impact, ultrasonication, and thermal fluctuation. The authors describe how these methods and devices can be used for the fail-safe, transportable, and long term clinical-grade preservation of sensitive biological matter such as organic molecules, tissues, organs and organisms. Furthermore, while these methods are described principally in the context of preservation of biological matter such as organic molecules, tissues, organs and organisms, they are equally relevant to all contexts requiring stable and predictable supercooling, including various metallurgical processes [10,11], semiconductor processing [12], cold storage of food products [13], etc.

SUMMARY OF THE INVENTION

The invention provides methods and devices for the high-stability supercooling of aqueous solutions or suspensions, and the preservation of biological matter therein. In an aspect the invention provides methods and devices for maintaining long term high-stability and transportable thermodynamic supercooling of an aqueous medium in a constant-volume (isochoric) system, in which biological materials may be stored at temperatures beneath the equilibrium freezing point of the medium without ice formation.

A preferable way in which this can be achieved is by placing the fluid and biologics in a rigid container; removing all or most gas phase from the container; sealing the container with an air-tight closure, thus inducing principally-air-free isochoric conditions; preventing cavitation, fluid-fluid surface instabilities, or density fluctuations by inducing principally-air-free isochoric conditions; preventing ice nucleation by preventing cavitation, fluid-fluid surface instabilities, or density fluctuations. The aqueous medium within the container may optionally be water or an aqueous solution containing organic molecules or chemical cryoprotectants. The biological materials may optionally be human or non-human cells, molecules, multicellular constructs, tissues, organs, or full organisms. The container may be optionally made of metal ceramic, or any other rigid material. Isochoric storage methods and devices can be used to enhance the long term supercooling stability and the ability to withstand system perturbations.

Another key element in this invention is the realization that because pressure changes with the formation of a first ice nucleus, the isochoric container features intrinsic real-time ice nucleation detection capabilities that can be used to ensure continued stability of the supercooled medium in the presence of an ice nucleation event. In some embodiments, nucleation detection is achieved by incorporating or connecting a means to monitor pressure such as a digital or analogue pressure transducer or gauge or an electrical resistance source into the container. We have found that under principally-air-free isochoric supercooling an ice nucleation event results in an increase in the hydrostatic pressure, unlike in other supercooling systems. Such a pressure increase will propagate through the system as a sound wave, and is thus detectable at the speed of sound in water (approximately 1500 m/s), and can be used to detect an ice nucleation event in real time. This high-speed real-time detection of nucleation is not possible when detecting nucleation using temperature monitoring, as heat diffuses through water at a much slower characteristic rate (approximately $10^{-8}$ m/s).

The container may further feature on-board or off-board means to deliver energy to the supercooled fluid to cause the dissolution or melting of a growing or stable ice nucleus or crystal. In a preferred embodiment, a heater may be used to melt any ice that may form and reset the state of supercooling, ensuring total safety of the preserved biologic. Compared to other supercooling conditions, ice forms much more slowly under air-free isochoric conditions due to reduced thermodynamic driving forces. The combination of slow ice formation and real-time nucleation detection enables rapid elimination of ice crystals via immediate controlled heating. Power for the heating may be supplied by an on-board or off-board power supply or battery. Arbitrary means may be used to provide the energy required for melting or dissolution of the ice phase, including joule heating, inductive heating, ultrasonic heating, electromagnetic heating, etc.

The container may feature on-board or off-board control capabilities, which employ a microprocessor, computer, or other programmable processing device to monitor the pressure reading from the pressure transducer and activate the energy delivery module (heating) should the pressure reading surpass a given threshold value. The controller will continuously monitor the pressure and turn off the energy delivery module (heating) when the pressure returns to beneath the threshold value, or another value as deemed appropriate, indicating that all or most ice has melted and that the state of stable supercooling may be resumed. This ensures that the temperature in the system is elevated only to just above the melting point of the medium and the stored biologic remains cold. The container is then allowed to return to the desired preservation temperature and supercooling is resumed. This control capability ensures total safety of the preserved biologic, even if the supercooled system should become briefly unstable.

In some embodiments, if the supercooled media destabilizes and ice begins to form for any reason, it may be allowed to grow and preservation may be continued with or without interruption.

The container may be cooled by immersion in an external cooling bath or by on-board cooling, and the cooling process may also be optionally controlled by the programmable processing device mentioned previously. Cooling of the container may be provided by cooled liquid, gas or vapor, by refrigeration, by phase-change material, by thermoelectric or peltier cooler, by stirling cooler, or by any arbitrary cooling mechanism.

The container may feature additional measures to protect the aqueous medium from cavitation caused by vibrations, which can cause unwanted ice nucleation. These vibrations may be encountered during flight, ground-transport, or general use. Protective measures may include a sleeve, coating, mount, or other external feature made of a vibration-reducing material such as neoprene or other rubbers, or may include springs or other mechanical features for vibration reduction.

The container may feature additional measures to protect the supercooled medium from temperature changes, which may destabilize the system and cause nucleation, or which may negatively affect the stored biologic. Such measures may optionally include a thermally insulating sheath, sleeve, or coating; a surrounding phase-change material; a vacuum-insulated panel, material, or chamber; or a secondary container or apparatus of any kind intended to thermally insulate the primary container.

The container may feature additional measures to further protect against heterogeneous nucleation at internal liquid-solid interfaces, including hydrophobic or superhydrophobic surfaces or surface coatings, including but not limited to polytetrafluoroethylene-based and perfluorocarbon-based substances.

The aqueous medium employed may optionally feature chemical cryoprotectants to modulate the range of temperatures in which the system is supercooled or an increase in the degree and stability of supercooling at a given preservation temperature, such as dimethyl sulfoxide, ethylene glycol, polyethylene glycol, 3-OMG, glycerol, antifreeze proteins etc. The aqueous medium may also include any other solute or combinations of solutes which reduce the freezing point of the solution, such as trehalose, glucose, fructose, mannitol, betaine, glycine, etc.

The container, housing a supercooled media and/or preserved biologic, may be stored at any temperature between 0° C. and −273° C., including −1° C., −2° C., −3° C., −4° C., −5° C., −6° C., −7-−20° C., . . . , −273° C. The container may also be cooled at any arbitrary rate, including <1° C. per minute, <5° C. per minute, <10° C. per minutes, <20° C. per minute, <50° C. per minute, . . . <1000° C. per minute, etc.

The stored biologic may be preserved within the container for any length of time, including but not limited to 6 hours, 8 hours, 12 hours, 18 hours, 24 hours, 2 days, 3 days, 4 days, 5 days, 6 days, 7 days, 2 weeks, 3 weeks, 1 month, 2 months, 3 months, 6 months, 1 year, 2 years, 3 years, 5 years, 10 years, 20 years.

The container may store biologics of any type or scale, including organic molecules, cells, blood, bone marrow, blood vessels, pancreatic islets, reproductive tissues, skin, etc. It may store full organs such as hearts, livers, kidneys, lungs, pancreases, spleens, etc.; other biologics such as eyes, full or partial limbs, fingers or toes, etc.; engineered tissues such as 3D microtissue constructs, liver-on-a-chip constructs, lung-on-a-chip constructs, heart-on-a-chip constructs, etc.; full organisms such as zebrafish, coral, nematodes, or other marine or land-dwelling animals; and foodstuffs such as cherries, berries, potatoes, tomatoes, fish, beef, etc.

The container may be made of any rigid material, including metals such as steel and alloys thereof, aluminum and alloys thereof, titanium and alloys thereof, copper and alloys thereof, etc.; ceramic materials; plastics such as acrylic, polyvinyl chloride, polymethylmethacrylate, polyurethane, etc.; composites such as carbon fiber reinforced polymers (CFRP) or glass fiber reinforced polymers (GFRP); or any combination thereof. This material may be subjected to one or multiple surface treatments, such as anodizing, nickel-plating, zinc-plating, etc., for the purposes of preventing corrosion, preventing heterogeneous ice nucleation, maintaining biocompatibility, etc.

The container may be made air-tight by a sealing mechanism, including rubber o-rings, spring energized o-rings, metal-on-metal contact, rubber gaskets, metal gaskets, etc. The closure of the container may make use of a threaded cap, a threaded plug, a clamped lid, a bolted lid, a mechanically-retained plate or plug, etc.

Within the primary container, preserved biologics may optionally also be stored in a secondary container, such as a bag, balloon, covered vial or tube, or other vessel with at least one flexible surface capable of transmitting hydrostatic pressure from its surroundings to its internal contents. This secondary container may also be filled with an aqueous solution, be completely or mostly free of air, and sealed. This secondary containment will protect the biologics from osmotic damage in the event that ice forms in the principal supercooled media (for however brief or long a period).

Biologics preserved within the container may also optionally be coated with or immersed in a cross-linked hydrogel, such as sodium alginate or hyaluronic acid cross-linked with calcium or other ionic, oxidative, or covalent cross-linkers. This cross-linked gel will protect the biologics from potential osmotic damage during stable supercooling or during periods of ice nucleation. This hydrogel may be impregnated with an organ preservation solution or any other manner of aqueous solution in the interest of maintaining osmotic balance, delivering drugs, enhancing anti-freezing effects, etc.

The solution within the container may optionally be seawater, and the preserved biologics may optionally be marine organisms or matter. These biologics may optionally be collected directly from the ocean.

In addition, the invention is also useful for providing aqueous environments that remain liquid at sub-zero centigrade temperatures, and thus may be used to facilitate temperature-controlled chemical reactions, polymerization, gelation, or other thermal or chemical processes.

Enumerated Claim Embodiments

1. A method of inducing high-stability and optionally transportable supercooling of aqueous media, the method comprising: providing a rigid container containing the aqueous media; ensuring the removal of all or most bulk gas phase from the contained aqueous media; sealing the container with a rigid air-tight closure in order to induce constant-volume thermodynamic conditions; and cooling the aqueous media to a temperature below 0° C.

2. A device for inducing high-stability and optionally transportable supercooling of aqueous media, the device comprising: a rigid container containing an aqueous media with little or no bulk gas phase present; a rigid air-tight closure to maintain isochoric (constant-volume) thermodynamic conditions within.

3. The method of claim 1, wherein the rigid container is constructed of materials selected from the group consisting of metals, metallic alloys, ceramics, plastics, rubbers, polymers, fiber-reinforced polymers, composites, or combinations or derivatives thereof.

4. The method of claim 1, wherein the rigid air-tight closure employs a sealing mechanism selected from the group consisting of matched seals, compression seals, metal-on-metal seals, ceramic-on-glass seals, ceramic-on-ceramic seals, metal-on-rubber seals, metal-on-polymer seals, plastic-on-plastic seals, plastic-on-rubber seals, rubber-on-rubber seals, epoxy seals, o-ring seals, gasket seals, spring energized seals, or any derivatives or combinations thereof.

5. The method of claim 1, wherein the rigid air-tight closure is selected from the group consisting of threaded cap, threaded plug, bolted cap, bolted plug, bolted plate, mechanically retained plate, mechanically retained plug, mechanically retained cap, clover-leaf mechanical closure, press-fit plug, press-fit cap, or any derivatives or combinations thereof.

6. The method of claim 1, wherein the percentage of the volume of bulk gas phase remaining in the aqueous media upon sealing of the container is less than 1%, 2%, 3%, 4%, or 5%.

7. The method of claim 1, wherein the volume capacity of the rigid container is <1 microliter, <1 ml, <5 ml, <10 ml, <15 ml, <20 ml, <25 ml, <50 ml, <100 ml, <200 ml, <300 ml, <500 ml, <750 ml, <1 L, <2 L, <3 L, <5 L, <10 L, <20 L, <50 L, <100 L, <1000 L, or <10,000 L.

8. The method of claim 1, wherein the temperature is less than 0° C., −1° C., −2° C., −3° C., −4° C., −5° C., −6° C., −7° C., −8° C., −9° C., −10° C., −11° C., −12° C., −13° C., −14° C., −15° C., −16° C., −17° C., −18° C., −19° C., −20° C., −21° C., −22° C., −30° C., −40° C., −60° C., −80° C., −120° C., −180° C., −196° C., or −273° C.

9. The method of claim 1, wherein the cooling takes place at a rate less than 1° C. per minute, 5° C. per minute, 10° C. per minutes, 20° C. per minute, 50° C. per minute, 100° C. per minute, 250° C. per minute, 500° C. per minute, 1000° C. per minute, or 2500° C. per minute.

10. The method of claim 1, wherein the container is maintained in a cooled state for less than 1 minute, 30 minutes, 1 hour, 6 hours, 12 hours, 18 hours, 24 hours, 2 days, 3 days, 4 days, 5 days, 6 days, 1 week, 2 weeks, 3 weeks, 4 weeks, 1 month, 2 months, 3 months, 6 months, 1 year, 2 years, 3 years, 5 years, 10 years, or 20 years.

11. The method of claim 1, wherein the aqueous media is an aqueous solution.

12. The method of claim 1, wherein the aqueous media is an aqueous suspension.

13. The method of claim 11, wherein the solute(s) in the aqueous solution is/are selected from the group comprising methanol, ethanol, glycerol, propylene glycol, ethylene glycol, glucose, galactose, fructose, lactose, sucrose, trehalose, raffinose, mannitol, sorbitol, polyethylene glycol, polyvinyl pyrrolidone, dextrans, ficoll, hydroxyethyl starch, serum proteins, milk proteins, anti-freeze proteins, peptones, dimethyl sulfoxide, acetamide, formamide, dimethyl acetamide, proline, glycine, glutamine, betaine, alcohols, sugars, polymers, sulfoxides, amides, amines, and derivatives or combinations thereof.

14. The method of claim 11, wherein the aqueous solution is seawater.

15. The method of claim 11, wherein the aqueous solution is a cold storage solution.

16. The method of claim 1, wherein the container is outfitted with on-board or off-board sensing implements, control implements, energy delivery implements, or cooling implements.

17. The device of claim 2, wherein the container is outfitted with on-board or off-board sensing implements, control implements, energy delivery implements, or cooling implements.

18. The method of claim 16, wherein the sensing implement is a device or material used to measure or detect pressure.

19. The method of claim 18, wherein the device is selected from the group consisting of digital pressure transducer, analog pressure transducer, digital pressure gauge, analog pressure gauge, electrical resistance source, piezoelectric sensor, piezospectroscopic sensor, strain gauge, optical pressure sensor, conditioned pressure sensor, capacitive pressure sensor.

20. The method of claim 18, wherein the material is piezoelectric or piezospectroscopic in nature.

21. The method of claim 18, wherein a change in pressure is used to detect the formation or elimination of ice within the aqueous media.

22. The method of claim 16, wherein the energy delivery implement uses an energy delivery mechanism selected from the group consisting of conductive heating, convective heating, radiative heating, inductive heating, Joule heating, electromagnetic heating, radio heating, or ultrasonic heating.

23. The method of claim 22, wherein the energy delivered by the energy delivery implement is used to melt, dissolve, or otherwise eliminate ice nuclei or crystals.

24. The method of claim 16, wherein the control implement is selected from the group consisting of computer, microprocessor, microcontroller, PID controller, or software.

25. The method of claim 16, wherein the cooling implement is selected from the group consisting of cooling bath, refrigeration cycle, heat exchanger, cooled liquid, gas or vapor, phase-change material, thermoelectric or peltier cooler, or stirling cooler.

26. The method of claim 18, wherein upon detection of a change in pressure, a routine is triggered within the control implement.

27. The method of claim 26, wherein the routine triggered within the control implement activates, deactivates, or modulates the output of the energy delivery implement.

28. The method of claim 26, wherein the routine triggered within the control implement generates an alert or signal.

29. The method of claim 26, wherein the routine triggered within the control implement activates, deactivates, or modulates the output of the cooling implement.

30. The method of claim 26, wherein the routine triggered within the control implement activates, deactivates or modulates the behavior of an additional sensor or implement.

31. The method of claim 1, wherein the container features supplemental protective measures to guard against agitation, ice nucleation, damage, or desterilization.

32. The device of claim 2, wherein the container features supplemental protective measures to guard against agitation, ice nucleation, damage, or desterilization.

33. The method of claim 31, wherein the protective measures are intended to protect from vibration and are selected from the group consisting of vibration-reducing sleeve, sheath, coating, mount, container, packaging, spring-loaded apparatus, or hanger.

34. The method of claim 31, wherein the protective measures are intended to protect from temperature change and are selected from the group consisting of thermally insulating sleeve, sheath, coating, mount, container, or packaging.

35. The method of claim 31, wherein the protective measures are intended to protect from temperature change and incorporate phase change materials.

36. The method of claim 35, wherein the phase change materials are selected from the group consisting of ice, wax, aqueous solutions, or eutectic salts.

37. The method of claim 31, wherein the protective measures are intended to protect against heterogeneous ice nucleation at liquid-solid interfaces and consist of surface treatments, coatings, or modifications made within the container or to any component which comes into contact with the aqueous media.

38. The method of claim 37, wherein the surface treatments, coatings, or modifications function to increase the hydrophobicity or superhydrophobicity of the surface.

39. The method of claim 38, wherein the surface treatments, coatings, or modifications make use of polytetrafluoroethylene, perfluorocarbons, fluorinated silanes, fluoropolymers, calcium carbonate, zinc oxide, manganese oxide, or derivatives or combinations thereof.

40. The method of claim 31, wherein the protective measures are intended to protect against corrosion, non-biocompatibility, scratching, or mechanical damage.

41. The method of claim 40, wherein the protective measures are surface treatments selected from the group consisting of anodization, nickel-plating, zinc-plating, 42. The method of claim 1, wherein biological matter is placed in the aqueous media.

43. The device of claim 2, wherein biological matter is preserved within the aqueous media.

44. The method of claim 42, wherein the biological matter is a cell, group of cells, multicellular construct, organelle, tissue, limb, organ, or organism.

45. The method of claim 44, wherein the organ is a heart, lung, kidney, liver, spleen, pancreas, brain, bladder, stomach, intestine, ovary, penis, testicle, eye, or portions or components thereof.

46. The method of claim 44, wherein the limb is a hand, forearm, foot, leg, head, finger, or toe.

47. The method of claim 44, wherein the multicellular construct is a pancreatic islet, blood vessel, or bone marrow.

48. The method of claim 42, wherein the biological matter is blood.

49. The method of claim 42, wherein the biological matter is reproductive tissue.

50. The method of claim 42, wherein the biological matter is an engineered tissue, organ, or organelle.

51. The method of claim 42, wherein the biological matter is food.

52. The method of claim 51, wherein the food is selected from the group consisting of cherries, berries, tomatoes, spinach, potatoes, fish, or beef.

53. The method of claim 44, wherein the organism is a fish, coral, marine creature, or nematode.

54. The method of claim 42, wherein the biological matter is perfused with and/or submerged in the aqueous media or a different aqueous solution.

55. The method of claim 54, wherein the biological matter is perfused via normothermic or hypothermic machine perfusion.

56. The method of claim 54, wherein the aqueous solution perfused into the biological matter contains solutes selected from the group consisting of methanol, ethanol, glycerol, propylene glycol, ethylene glycol, glucose, galactose, fructose, lactose, sucrose, trehalose, raffinose, mannitol, sorbitol, polyethylene glycol, polyvinyl pyrrolidone, dextrans, ficoll, hydroxyethyl starch, serum proteins, milk proteins, antifreeze proteins, peptones, dimethyl sulfoxide, acetamide, formamide, dimethyl acetamide, proline, glycine, glutamine, betaine, alcohols, sugars, polymers, sulfoxides, amides, amines, and derivatives or combinations thereof.

57. The method of claim 42, wherein the biological matter is placed in a secondary container within the aqueous media.

58. The device of claim 43, wherein the preserved biological matter is housed in a secondary container within the aqueous media.

59. The method of claim 57, wherein the secondary container has at least one flexible surface to enable the equilibration of hydrostatic pressure between the contents of the secondary container and the surrounding aqueous media.

60. The method of claim 57, wherein the secondary container is also filled with an aqueous solution the same as or different from the surrounding aqueous media.

61. The method of claim 57, wherein the secondary container is filled with an aqueous solution with an equilibrium freezing temperature lower than that of the surrounding aqueous media.

62. The method of claim 42, wherein the biological matter is comprised of one or multiple individual samples of or groups of samples.

63. The method of claim 57, wherein multiple secondary containers are placed within the aqueous media.

64. The method of claim 57, wherein the secondary container is a bag, balloon, covered tube, or covered vial.

65. The method of claim 1, wherein one or multiple rigid containers are housed within a secondary container or incorporated into a larger device.

66. The device of claim 2, wherein one or multiple rigid containers are within a secondary container or incorporated into a larger device.

67. The method of claim 65, wherein the secondary container or device is intended for transportation by air, sea, or ground transit.

68. The device of claim 66, wherein the secondary container or device is intended for transportation by air, sea, or ground transit.

69. The method of claim 65, wherein the secondary container or device features temperature control capabilities, vibration reduction capabilities, pressure control capabilities, or protective packaging.

70. The method of claim 65, wherein the multiple rigid containers are sealed by the same or different closures.

71. The method of claim 65, wherein the conditions of the secondary container or any of the rigid containers are remotely monitored.

72. The method of claim 1, wherein the rigid container is built in any geometry.

73. The device of claim 2, wherein the rigid container is built in any geometry.

74. The method of claim 72, wherein the geometry is cylindrical, spherical, rectilinear, or any derivatives or combinations thereof.

75. The method of claim 74, wherein the geometry contains dimensions at length scales selected from the group consisting of nanometers, micrometers, millimeters, or meters.

76. The method of claim 1, wherein the rigid container is built from a transparent material.

77. The device of claim 2, wherein the rigid container is built from a transparent material.

78. The method of claim 76, wherein the transparent container is monitored using a microscope or imaging platform.

79. The method of claim 1, wherein the container is used to study phase change phenomena.

80. The method of claim 75, wherein the container is used to study phase change phenomena at the nanoscale or microscale.

81. The method of claim 76, wherein the transparent container is used to study phase change phase change phenomena or observe the behavior of biological matter.

82. The method of claim 42, wherein the biological matter is coated, immersed, or encapsulated in a crosslinked or uncrosslinked hydrogel.

83. The method of claim 82, wherein the hydrogel is alginate, hyaluronic acid, or derivatives or combinations thereof.

84. The method of claim 82, wherein the hydrogel is impregnated with an aqueous solution or drug.

85. The method of claim 1, wherein the aqueous media is exposed to a magnetic or electric field.

86. The method of claim 85, wherein the magnetic electric field is static, oscillating, or pulsed.

87. The method of claim 1, wherein the container and aqueous media are used to facilitate chemical processes or reactions at temperatures equal to or below 0° C.

88. The method of claim 1, wherein the aqueous media is replaced by a liquid metal, alloy, or semi-conducting material.

89. The method of claim 88, wherein the supercooling of the liquid metal, alloy, or semi-conducting material is used to control the rate at which it will crystallize or its resulting crystalline structure.

90. The method of claim 1, wherein if ice should form within the aqueous media, the ice is allowed to form a two-phase liquid-solid equilibrium.

91. The device of claim 2, wherein if ice should form within the aqueous media, the ice is allowed to form a two-phase liquid-solid equilibrium.

92. The method of claim 39, wherein if ice should form within the aqueous media, the biologic may still be preserved.

The invention encompasses all combination of the particular aspects and embodiments recited herein, as if each combination had been laboriously recited.

BRIEF DESCRIPTION OF THE DRAWINGS

FIGS. 1A-1B: Comparison of isobaric (T-P) and isochoric (T-V) thermodynamic conditions for water and ice. A. Isobaric systems maintain contact with a pressure reservoir (the atmosphere in the context of this work), and thus fluctuate constantly in density at the microscopic scale. Density fluctuations can lead to ice nucleation, and at atmospheric pressure, water in an isobaric system will transform entirely to ice-1 h at sub-zero centigrade temperatures. B. Isochoric systems are held at constant-volume, isolated from the atmosphere, and thus do not fluctuate in density. Water in an isochoric system will not freeze entirely at sub-zero centigrade temperatures, instead forming a two-phase water-ice equilibrium. Given that the final state of the system is a two-phase equilibrium, the nucleation barrier to nucleation in an isochoric system will be higher and the total growth rate of ice upon nucleation will be slower.

FIG. 8: Dimensioned assembly view of an optional three-part design for the base container used in principally-air-free isochoric supercooling methods and devices. This design includes a cylindrical body (21), a custom-designed sealing plug (22), and a heavy-duty threaded cap (23).

FIG. 9: Mechanical drawing of the cylindrical body part of an optional three-part design for the base container used in principally-air-free isochoric supercooling methods and devices, including a cylindrical body (21) and a heavy-duty threaded cap (23).

FIG. 12: Drawing of an optional configuration of a principally-air-free isochoric supercooling device featuring pressure-based real-time nucleation detection, digital control, responsive Joule heating for the containment of destabilization events, a soft rubber vibration-isolating sleeve to protect against vibrationally-induced ice nucleation, and secondary containment of the preserved biologic for additional protection against potential osmotic and ice-growth damage. The configuration comprises an O-ring seal (31), Joule heating coil (32), preserved biologic(s) (33), secondary container for biologic (34), primary supercoooled liquid (35), soft rubber sleeve (36) for vibration isolation, secondary access (37) for safety rupture disk or additional wiring, power supply (38), relay (39), control unit (40) and pressure transducer (41).

FIG. 13: Sample pressure and heating trajectory of a principally-air-free isochoric supercooling device when the supercooled media is artificially destabilized and ice nucleation is induced. The rise in pressure accompanying ice formation triggers local heating of the container, which continues until the ice crystals have dissipated (as signaled by the dissipation of pressure) and supercooling can be resumed.

DESCRIPTION OF PARTICULAR EMBODIMENTS OF THE INVENTION

Figure 3:
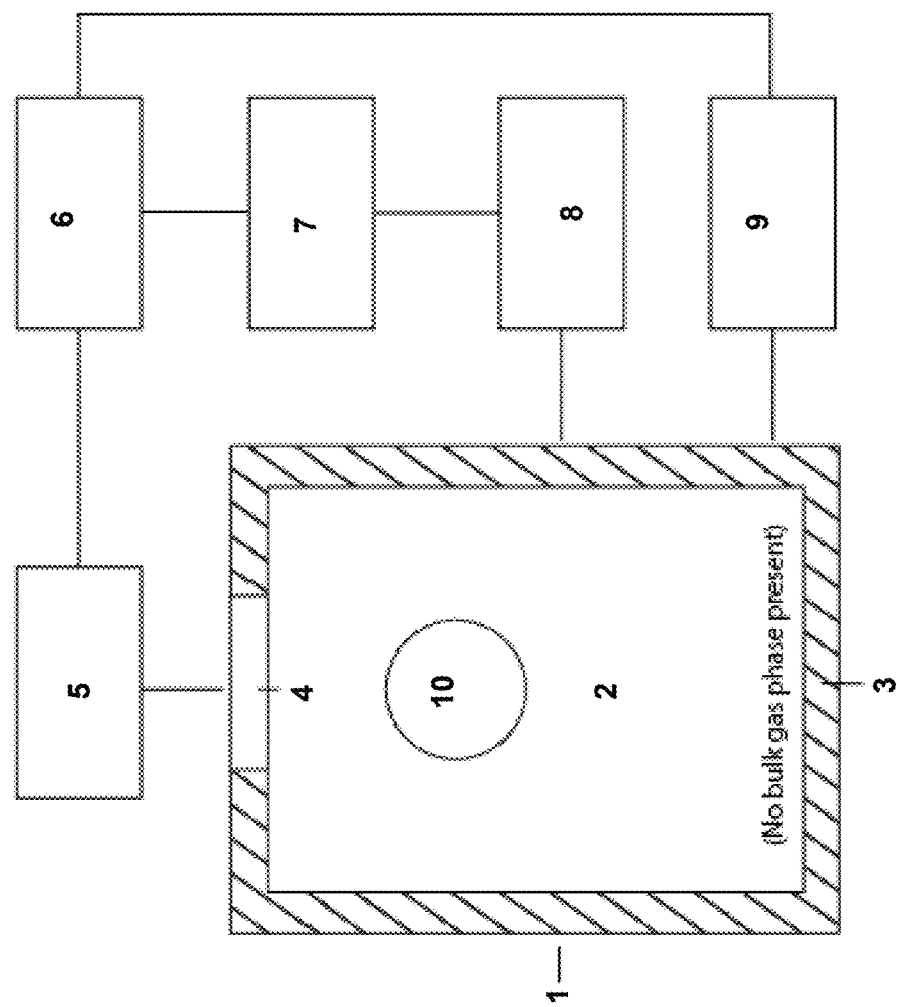
FIG. 3: Schematic of one embodiment of an isochoric supercooling device (1), comprising a supercooled aqueous media (2) constrained within a rigid container (3) comprising a rigid air-tight closure (4), and featuring a pressure monitoring implement (5), a control unit (6), a power supply (7), an energy delivery implement (8), a cooling implement (9), and a preserved biologic(s) (10).

Effective preservation of complex organ and tissue systems is essential to a wide range of $21^{st}$ century medical and research efforts[14], including expanding access to lifesaving organ transplantations, enabling the storage and transportation of engineered tissues for drug-testing, etc. While classical approaches to preservation have often included high doses of cryoprotectant chemicals to avoid damage from ice formation, a new generation of protocols is leveraging thermodynamic supercooling to dramatically enhance the duration and quality of biopreservation while minimizing cryoprotectant concentrations[7,15-17].

Although this approach has produced strong early biological results in the laboratory, the reduction of these protocols to practice in a clinical or industry setting faces a fundamental limitation: thermodynamic stability [18]. Supercooling is a metastable thermodynamic state, in which a substance remains liquid at temperatures beneath its freezing point due to a lack of sufficient kinetic stimuli. Upon even slight agitations, a supercooled system can instantaneously and destructively freeze, returning to thermodynamic equilibrium and destroying any preserved biologics. This can also happen randomly after sufficiently long periods of preservation, because the probability for ice nucleation is a function of time. Thus, in order to develop supercooling preservation protocols that are practicable outside a highly controlled laboratory environment, long term, transportable, and clinically convenient, new methods but be sought to enhance the stability of supercooled systems.

We present here an isochoric (constant-volume) supercooling method which greatly enhances the stability of supercooled water in the face of a range of mechanical and thermal disturbances by minimizing the effects of many different ice nucleation mechanisms. Without being bound by theory, we also present several possible explanations concerning the fundamental mechanisms contributing to this enhancement, unifying factors that stem from thermodynamics, fluid dynamics, and kinetics. The results herein have been put to immediate use in the preservation of sensitive biological matter, to excellent effect.

Isochoric (Constant-Volume) Supercooling

Nucleation of a stable ice phase from supercooled (metastable) water occurs when a perturbation within the system proves sufficiently large to drive the free energy of a cluster of liquid molecules over the nucleation barrier [6]. Such perturbations can stem from the constant random microscopic fluctuations undergone by any system with finite temperature, or from micro- or macroscopic mechanical or thermal agitation [2, 3, 19]. Thus, for a supercooling-based preservation technique to become practical or clinically relevant, it must maintain stability not only when experiencing microscopic fluctuations, but also when experiencing the macroscopic agitations that characterize practical use and mobility, including, long term preservation, motion, macroscopic vibration, impact with rigid surfaces, temperature swings, etc.

Most supercooling preservation protocols operate under isothermal (constant temperature) and isobaric (constant pressure) conditions. According to statistical thermodynamics, systems in contact with a temperature reservoir (such as a cooling bath) and a pressure reservoir (the atmosphere) are free to fluctuate in energy and volume [20] (or density if mass is constant), the extensive conjugates of temperature and pressure (FIG. 1A, left). Thus, systems under isobaric conditions are constantly undergoing microscopic density fluctuations due to the random motion of particles, which can lead to the formation of ice clusters that meet and exceed the critical size required for nucleation. Furthermore, when exposed to macroscopic perturbations, isobaric systems in contact with the atmosphere are susceptible to bulk fluid motion and bulk mixing with air, which can also lead to nucleation through cavitation or the introduction of new nucleation sites [7, 8, 19].

Isochoric (constant-volume) systems, by their very definition, do not microscopically fluctuate in density [20] (FIG. 1B, left), and restrict bulk motion of the contained liquid. Furthermore, we have shown that both the process of ice nucleation and growth and the fundamental water-ice phase equilibria are different under isochoric conditions: As seen by comparing the T-P and T-V phase diagrams for pure water (FIG. 1A/B, right), nucleation at constant pressure yields complete freezing, while nucleation at constant volume yields only partial freezing, resulting in a two-phase water-ice equilibrium. This ultimate two-phase equilibrium has myriad useful consequences, and we have demonstrated theoretically that amongst these consequences may be heightened nucleation barriers and reduced thermodynamic driving forces for nucleation (see Example 1 to follow). Additionally, in isochoric systems, all fluid-fluid interfaces are eliminated and bulk motion of the water is totally constrained; this drastically minimizes the chance of cavitation events that may initiate ice nucleation, eliminates the opportunity for fluid-fluid interface instabilities that may initiate ice nucleation, and removes any opportunity for heterogeneous nucleation of ice on a bubble or surface of a gaseous or secondary liquid phase.

The sum total of these thermodynamic, kinetic, and fluid-dynamic considerations demonstrate that isochoric conditions augment supercooling through myriad different yet complementary means, the combination of which provides a level of stability and protection against ice nucleation that is both unprecedented and unclaimed in other technologies. Based on these considerations, which are further clarified in Examples to follow, we claim that the methods and devices described in this disclosure, which universally employ isochoric conditions, can be used to yield enhanced supercooling stability.

Description of Methods and Devices

The invention provides methods and devices for maintaining long term high-stability and optionally transportable thermodynamic supercooling of aqueous media in a constant-volume (isochoric) system, in which biological materials may be stored at temperatures beneath the equilibrium freezing point of the media without ice formation.

Figure 2:
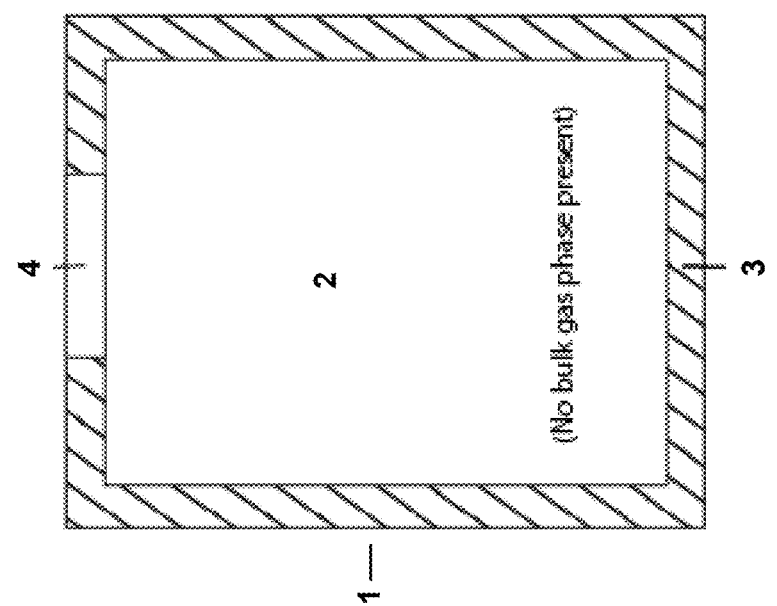
FIG. 2: Schematic of one embodiment of a basic isochoric supercooling device (1). A supercooled aqueous media (2) is constrained within a rigid container (3), comprising a rigid air-tight closure (4), with no bulk gas phase present and an air-tight seal, so not exposed to an atmosphere nor a compressible bulk gas phase. The constrained, bulk-gas-free volume creates isochoric (constant-volume) thermodynamic conditions, eliminates all fluid-fluid interfaces, eliminates random density fluctuations, and decreases the likelihood of cavitation, all of which increase the stability of supercooling and decrease the likelihood of ice nucleation.

In many embodiments, the most basic configuration of this device is presented schematically in FIG. 2. In this and future figures, the term "bulk gas phase" is taken to mean bubbles or other configurations of one or multiple undissolved gaseous phases comprising a thermodynamically appreciable volume of the system, which may optionally be equal to >1%, >2%, >3%, >4%, or >5%. Any dissolved gases are taken to be a component of the supercooled aqueous media. The rigid container indicated may be constructed of any rigid material, such as a metal or metallic alloy, glass, ceramic, polymer, plastic, hard rubber, composite material, or any combination thereof. The rigid container may also be constructed in any arbitrary geometry, including cylindrical, spherical, rectilinear, and any combination thereof. The air-tight closure may be constructed using any arbitrary sealing or retention mechanism, such as an o-ring or gasket-based seal, metal-on-metal contact seal, threaded seal, etc.

In preferred embodiments, the invention is optimally suited for the preservation of biological matter, which in preferred embodiments may be achieved by: placing aqueous media and biologic(s) in a rigid container; removing all or most bulk gas phase from the container; sealing the container with an air-tight closure, thus inducing isochoric conditions; preventing cavitation, fluid-fluid interface effects and instabilities, bulk motion of the media, or density fluctuations by inducing isochoric conditions; preventing ice nucleation by preventing cavitation, fluid-fluid interface effects and instabilities, bulk motion of the media, or density fluctuations. The aqueous media within the container may optionally be water or an aqueous solution containing organic molecules or chemical cryoprotectants. The preserved biologics may optionally be human or non-human cells, multicellular constructs, tissues, organs, or full organisms. Isochoric storage methods and devices can be used to enhance the long term preservation and supercooling stability and the ability to withstand system perturbations.

In other preferred embodiments, any number of sensing and control implements may be incorporated into an isochoric supercooling device. FIG. 3 depicts schematically one preferred embodiment of the device in which pressure monitoring capabilities, active control capabilities, energy delivery capabilities, and cooling capabilities are incorporated.

Given the fact that ice is less dense than liquid water, at constant-volume, the nucleation of ice will cause an immediate increase in hydrostatic pressure. Because pressure changes with the formation of a first ice nucleus, isochoric containers feature intrinsic real-time ice nucleation detection capabilities that can be used to ensure continued stability of the supercooled media. In some embodiments, nucleation detection is achieved by incorporating or connecting a means to monitor pressure, such as a digital or analogue pressure transducer or gauge or an electrical resistance source, into, onto, or in communication with the container. We have found that under isochoric supercooling, an ice nucleation event results in an easily detectable increase in the hydrostatic pressure, unlike in other non-isochoric supercooling systems. Such a pressure increase will propagate through the system as a sound wave, and is thus detectable at the speed of sound in water (approximately 1500 m/s), enabling real-time detection of nucleation events. This high-speed real-time detection of nucleation is not possible when attempting to detect nucleation using temperature monitoring, as heat diffuses through water at a much slower characteristic rate (approximately 10^-8 m/s), and can be used not only to monitor stability but also to trigger various re-stabilizing actions, such as controlled melting of emerging ice crystals.

In some embodiments, the container may further feature on-board or off-board means to deliver energy to the supercooled fluid to cause the dissolution or melting of a growing or stable ice nucleus or crystal. In a preferred embodiment, a heater situated within or external to the container may be used to melt any ice that may form and reset the state of supercooling, ensuring total safety of the preserved biologic. Compared to other supercooling conditions, ice forms much more slowly under air-free isochoric conditions due to reduced thermodynamic driving forces. The combination of slow ice formation and real-time nucleation detection enables rapid elimination of ice crystals via immediate controlled heating. Power for the heating may be supplied by an on-board or off-board power supply or battery. Arbitrary means may be used to provide the energy required for melting or dissolution of the ice phase, including joule heating, inductive heating, ultrasonic heating, electromagnetic heating, etc.

In some embodiments, the container may feature on-board or off-board control capabilities, which may in preferred embodiments employ a microprocessor, computer, or other programmable processing device to monitor the pressure reading from the pressure transducer and activate the energy delivery module (heating) should the pressure reading surpass a given threshold value. The controller may continuously monitor the pressure and turn off the energy delivery module (heating) when the pressure returns to beneath the threshold value, or another value as deemed appropriate, indicating that all or most ice has melted and that the state of stable supercooling may be resumed. This ensures that the temperature in the system is elevated only to just above the freezing point of the medium and the stored biologic remains cold and preserved. The container is then allowed to return to the desired preservation temperature and supercooling is resumed. This control capability ensures total safety of the preserved biologic, even if the supercooled system should become briefly unstable, and is unique to isochoric systems and unprecedented in the field of supercooling.

In some additional embodiments, if the supercooled media destabilizes and ice begins to form for any reason, it may be also be allowed to grow and preservation may be continued with or without interruption. Isochoric conditions offer an additional layer of protection for biologics in the case of destabilization, because only part of the system will convert to ice after nucleation, resulting in a stable ice-water two-phase equilibrium. In accordance with the T-V phase diagram provided in FIG. 1B. Thus, in some embodiments, the biologic can continue ice-free or partially-frozen preservation within the isochoric container after ice has nucleated and been allowed to grow. This secondary protection of initially-supercooled biologics is also unique to isochoric systems.

In some embodiments, a secondary container may be used to house one or multiple primary isochoric containers. In some embodiments, a secondary container may be used to house one or multiple primary isochoric containers for the purposes of transportation. In some embodiments, the secondary container may include measures to protect the housed primary container(s) from temperature changes, vibration, ultrasonic stimulation, contamination, desterilization, or any other kind of disturbance. In some embodiments, a secondary container may be used which specifically enhances the suitably of the primary container for air, ground, or sea transportation.

In some embodiments, a single device may be built which includes more than one isochoric container. In some embodiments, two or more of these isochoric containers may be sealed by the same or different mechanisms.

In some embodiments, the container may be cooled by immersion in an external cooling bath or by on-board cooling, and the cooling process may also be optionally controlled by the programmable processing device mentioned previously. Cooling of the container may be provided by cooled liquid, gas or vapor, by refrigeration, by phase-change material, by thermoelectric or peltier cooler, by stirling cooler, or by any arbitrary cooling mechanism. In some embodiments, cooling of the container may be active, as provided for example by refrigeration, and in other embodiments it may be passive, as provided for example by a phase change material such as ice or a eutectic salt.

In some embodiments, the container may feature additional measures to protect the supercooled aqueous media from cavitation caused by vibrations, which can cause unwanted ice nucleation. These vibrations may be encountered during flight, ground-transport, or general use. Protective measures may include a sleeve, coating, mount, or other external feature made of a vibration-reducing material such as neoprene or other rubbers, or may include springs or other mechanical features for vibration reduction. In some embodiments, a primary isochoric container may be placed in a secondary container for the purpose of vibration reduction, isolation, or protection.

In some embodiments, the container may feature additional measures to protect the supercooled medium from temperature changes, which may destabilize the system and cause nucleation, or which may negatively affect the stored biologic. Such measures may optionally include a thermally insulating sheath, sleeve, or coating; a surrounding phase-change material; a vacuum-insulated panel, material, or chamber; or a secondary container or apparatus of any kind intended to thermally insulate the primary container.

In some embodiments, the container may feature additional measures to further protect against heterogeneous nucleation at internal liquid-solid interfaces, including hydrophobic or superhydrophobic surfaces or surface coatings, including but not limited to polytetrafluoroethylene-based and perfluorocarbon-based substances.

In some embodiments, the aqueous media employed may optionally feature chemical cryoprotectants to modulate the range of temperatures in which the system is supercooled or an increase in the degree and stability of supercooling at a given preservation temperature. In some embodiments, such cryoprotectants may include dimethyl sulfoxide, ethylene glycol, polyethylene glycol, 3-OMG, glycerol, etc. The aqueous media may also include any other solute or combinations of solutes which reduce the freezing point of the solution, including but not limited to trehalose, glucose, fructose, mannitol, betaine, glycine, sodium, calcium, potassium, magnesium, combinations thereof, and etc.

In some embodiments, the container may be stored at any temperature between 0° C. and −273° C., including −1° C., −2° C., −3° C., −4° C., −5° C., −6° C., −7--20° C., . . . −273° C. The container may also be cooled at any arbitrary rate, including <1° C. per minute, <5° C. per minute, <10° C. per minutes, <20° C. per minute, <50° C. per minute, . . . <1000° C. per minute, etc.

In some embodiments, the volume capacity of the container may be <1 microliter, <1 ml, <5 ml, <10 ml, <15 ml, <20 ml, <25 ml, <50 ml, <100 ml, <200 ml, <300 ml, <500 ml, <750 ml, <1 L, <2 L, <3 L, <5 L, <10 L, <20 L, <50 L, <100 L, <1000 L, <10,000 L.

In some embodiments, the stored biologic may be preserved within the container for any length of time, including but not limited to 6 hours, 8 hours, 12 hours, 18 hours, 24 hours, 2 days, 3 days, 4 days, 5 days, 6 days, 7 days, 2 weeks, 3 weeks, 1 month, 2 months, 3 months, 6 months, 1 year, 2 years, 3 years, 5 years, 10 years, 20 years.

In some embodiments the container may store biologics of any type or scale, including organic molecules, cells, blood, bone marrow, blood vessels, pancreatic islets, reproductive tissues, skin, etc. It may store full organs such as hearts, livers, kidneys, lungs, pancreases, spleens, etc.; other biologics such as eyes, full or partial limbs, fingers or toes, etc.; engineered tissues such as 3D microtissue constructs, liver-on-a-chip constructs, lung-on-a-chip constructs, heart-on-a-chip constructs, etc.; full organisms such as zebrafish, coral, nematodes, or other marine or land-dwelling animals; and foodstuffs such as cherries, berries, potatoes, tomatoes, fish, beef, etc.

In some embodiments, preserved biologics may be perfused with or in the aqueous media prior to preservation. In other embodiments, biologics may undergo some manner of conditioning prior to preservation, including normothermic or hypothermic machine perfusion, passive or active perfusion with or immersion in an aqueous solution of any kind.

In some embodiments container may be made of any rigid material, including metals such as steel and alloys thereof, aluminum and alloys thereof, titanium and alloys thereof, copper and alloys thereof, etc.; ceramic materials; plastics such as acrylic, polyvinyl chloride, polymethylmethacrylate, polyurethane, etc.; composites such as carbon fiber reinforced polymers (CFRP) or glass fiber reinforced polymers (GFRP); or any combination thereof. In some embodiments, the container may be made from a composite-overwrapped pressure vessel. In some embodiments, this material may be subjected to one or multiple surface treatments, such as anodizing, nickel-plating, zinc-plating, etc., for the purposes of preventing corrosion, preventing heterogeneous ice nucleation, maintaining biocompatibility, etc.

In some embodiments, the container may be made airtight by a sealing mechanism, including rubber o-rings, spring energized o-rings, metal-on-metal contact, rubber gaskets, metal gaskets, etc. In some embodiments, the closure of the container may make use of a threaded cap, a threaded plug, a clamped lid, a bolted lid, a mechanically-retained plate or plug, etc.

In some embodiments, within the primary container, preserved biologics may optionally also be stored in a secondary container, such as a bag, balloon, covered vial or tube, or other vessel with at least one flexible surface capable of transmitting hydrostatic pressure from its surroundings to its internal contents. This secondary container may also be filled with an aqueous solution, be completely or mostly free of bulk gas phase, and sealed. This secondary aqueous solution may be the same as or different from the aqueous solution within the primary container. This secondary containment will protect the biologics from osmotic damage in the event that ice forms in the principal supercooled media (for however brief or long a period). In some embodiments, the secondary containment may preserve one or multiple biologics, and in some embodiments one or multiple secondary containers may be deployed within the primary container.

In some embodiments, biologics preserved within the container may also optionally be coated with or immersed in a cross-linked hydrogel, such as sodium alginate or hyaluronic acid cross-linked with calcium or other ionic, oxidative, or covalent cross-linkers. This cross-linked gel will protect the biologics from potential osmotic damage during stable supercooling or during periods of ice nucleation. This hydrogel may be impregnated with an organ preservation solution or any other manner of aqueous solution in the interest of maintaining osmotic balance, delivering drugs, enhancing anti-freezing effects, etc.

In some embodiments, the solution within the container may optionally be seawater, and the preserved biologics may optionally be marine organisms or matter. In some embodiments, these biologics may optionally be collected directly from the ocean.

In some embodiments, the container, aqueous media, or biologic may be exposed to electric or magnetic fields. These fields may be of a static, oscillating, or pulsed nature. The combination of electric or magnetic fields with isochoric conditions may further enhance supercooling stability in the enclosed aqueous media.

In some embodiments, the container may be fabricated from a transparent rigid material. This container may optionally be used to study or monitor the internal contents or behaviors of the container, including but not limited to the behavior of preserved biologics or of phase transitions that may occur during a destabilization or ice nucleation event. In some embodiments, the container may be integrated into a microscope platform, allowing microscopic examination of the contents within. In some embodiments, the container may be constructed in geometries at the millimeter or micron length scale for these purposes.

In some embodiments, containers may be constructed at the millimeter or micron length scale for any purpose, including but not limited to the preservation of individual cells or groups of cells, rapid cooling for the purposes of maintaining supercooling until the glass transition temperature of the aqueous media, study of microscale thermophysical properties or effects under isochoric conditions, etc.

In addition, the invention is also useful for providing aqueous environments that remain liquid at sub-zero centigrade temperatures, and thus may in some embodiments be used to facilitate temperature-controlled chemical reactions, polymerization, gelation, or other thermal or chemical processes. The invention may also be used to control supercooling of liquid metals or semiconductors for the eventual purposes of controlled crystallization.

EXAMPLES

The invention is further illustrated in the following examples, which do not limit the scope of the invention described in the claims.

Example 1: Theoretical Analysis of Thermodynamic and Kinetic Factors Restricting Ice Nucleation and Growth in Isochoric Systems Without being bound to the theory, we will introduce here a conceptual theoretical analysis of supercooled thermodynamic systems under isochoric and conventional isobaric conditions. The experimental results described in future examples are the basis for our invention and claims, and this theoretical section is included only for clarity and completeness.

Thermodynamic formulation of the water-ice phase transition under different conditions The phase transitions of water are generally described using natural variables of temperature and pressure, which correspond to the Gibbs thermodynamic potential G(T,P). Consider the freezing of pure water in an undeformable container (that is, at constant volume). Water expands upon freezing to ice-1 h, and should the container have a lower specific volume than that of ice-1 h, the contents of the system will never be able to freeze entirely, resulting in a two-phase water-ice equilibrium. The standard T-P phase diagram for pure water includes only single-phase regions, so this anticipated two-phase equilibrium of water and ice under isochoric conditions cannot be quantified in a straightforward fashion from the traditional water phase diagram. By retaining pressure as a natural variable, one is forced to analyze this two-phase equilibrium as occurring between two distinct entities—the ice and the water—and one must solve for mechanical equilibrium by balancing the bulk moduli of the solid and liquid phases against the hydrostatic pressure that emerges as the ice forms and expands [21]. While the equilibrium states of the system can indeed be predicted using this approach, the mathematical formulation proves awkward, and must be continuously re-solved as temperature and pressure are altered.

While the Gibbs potential is appropriate under most physical contexts, it is only one of many possible Legendre transforms of the internal energy, U(S,V). Should a situation arise in which the Gibbs free energy ceases to be convenient, it should be replaced in favor of a better-suited potential. For the case of freezing under isochoric conditions, a more elegant thermodynamic approach is to exchange pressure as a natural variable in favor of volume, thereby leveraging the Helmholtz thermodynamic potential for this analysis. In this description, the thermodynamic boundary conditions are reframed around the containing vessel, describing the entire two-phase water-ice system at once.

Herein we use the Helmholtz free energy to derive the equilibrium phase behaviors of water held in a constant volume system at subzero temperatures. Our derivation yields the T-V phase diagram for water and ice, featuring a prominent two-phase equilibrium region, analogous to those found in binary eutectic phase diagrams. We also derive a classical nucleation theory for ice under isochoric conditions, which reveals fundamental differences between the kinetics of freezing under constant volume versus constant pressure. In isochoric systems, we reveal that the energetic barrier to nucleation is higher, and that there exists a critical absolute volume threshold (on the order of microns), under which nucleation of a single ice nucleus becomes kinetically prohibited. Our analyses here provide a classical foundation from which to analyze the thermodynamics and kinetics of freezing in isochoric systems; establishing context to interpret the phenomenology of water and ice under these important boundary conditions.

Construction of a T-V Phase Diagram Using the Helmholtz Free Energy

Phase diagrams are constructed by a projection of the lowest free-energy phases onto axes of the natural thermodynamic variables. The choice of natural variables governs the geometry of the free-energy surfaces, and thereby the phase coexistence behavior in the resulting phase diagram.

In order for a homogeneous single-phase substance to be stable, its internal energy surface, U, must be positive-definite; $\partial^2 U/\partial X^2 > 0$, where X are the extensive thermodynamic variables X=S, V, N, etc. When it is not convenient to use an extensive natural variable, a new thermodynamic potential can be constructed with intensive natural variables, Y=T, P, μ, etc, by a Legendre transformation of the extensive variable with respect to its intensive conjugate, U–($\partial U/\partial X$) X=U–XY [22]. Following a Legendre transformation, the curvature of the free-energy surface becomes concave-down in the corresponding intensive thermodynamic variable(s) [23], or otherwise retains the convex-up curvature of U in the extensive variable(s) [24].

The Gibbs potential has intensive natural variables of temperature and pressure, and thus Gibbs free-energy surfaces are concave-down in both T and P. Projection of the lowest Gibbs free-energy phase onto the temperature and pressure axes recovers the standard T-P phase diagram, as shown for $H_2O$ in FIG. 4A, constructed using thermodynamic data from the International Association for the Properties of Water and Steam (IAPWS) [25,26]. For a single-component system like $H_2O$, phase coexistence is governed by the intersection of these concave-down free-energy surfaces, resulting in a 1-dimensional phase-coexistence line in the T-P plane.

In an isochoric system however, the natural variables should be temperature and volume, rather than pressure, which corresponds to the Helmholtz thermodynamic potential, F. We can construct F(T,V) for water and ice-1 h by a Legendre transform of the Gibbs free energy data as:

$$F(T,V)=G(T,P(V))-PV$$

Because V is extensive and T is intensive, F is convex-up in volume, and concave-down in temperature.

The convexity of the Helmholtz free-energy as a function of volume fundamentally changes the nature of phase coexistence in the T-V space. The lowest free-energy envelope now includes tangent lines between the convex $F_{water}(V)$ and $F_{ice}(V)$ curves, which signify a 2D two-phase equilibrium region, as opposed to a 1D phase-coexistence line. Gibbs called these tangent lines "Lines of Dissipated Energy" [27], along which a single-phase homogeneous substance can reduce its free-energy by forming a heterogeneous mixture of two phases. These tangent lines are analogous to those used in the convex hull construction of binary eutectic phase diagrams, which are constructed from the Gibbs free energy, G(T,x)[28]. The convex hull construction can be applied to both G(x) and F(V) because both composition and volume are extensive variables, and thus their free-energy surfaces are convex-up.

Figure 4B:
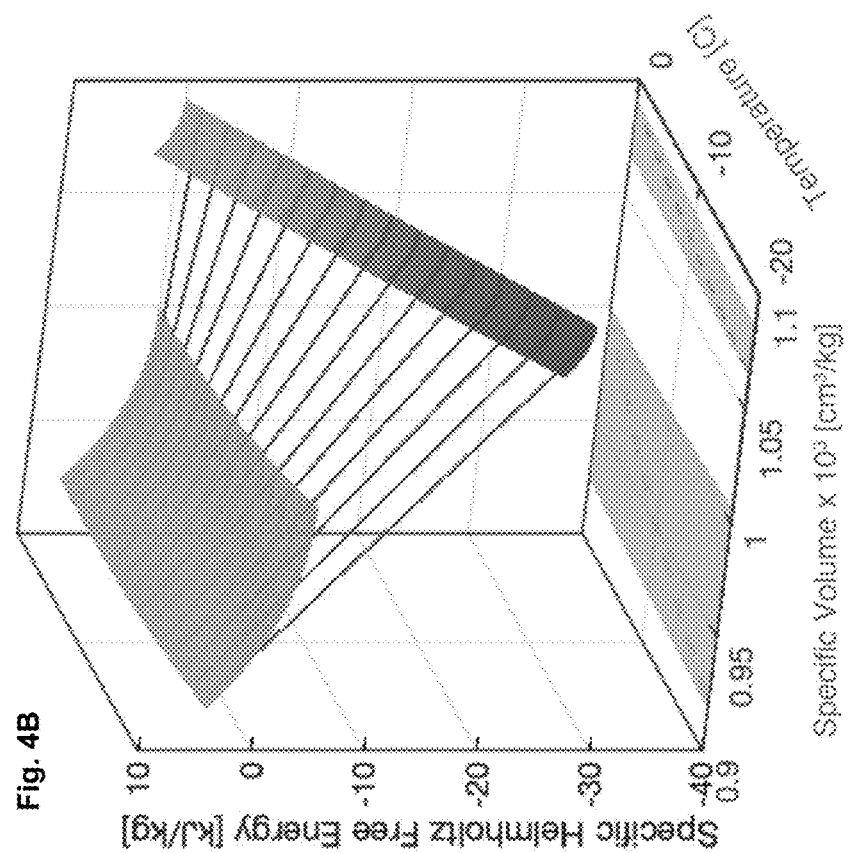
FIGS. 4A-4D. Thermodynamic landscapes of water and ice-1 h under different thermodynamic boundary conditions. A. Gibbs free energy landscape of water and ice-1 h in a system with natural variables temperature and pressure. The projection on the temperature-pressure plane gives the standard phase diagram for water. B. Helmholtz free energy landscape of water and ice-1 h in a system with natural variables temperature and volume (plotted here in specific form for convenience). Common tangents between the phases define the range over which a two-phase mixture in equilibrium will produce the lowest system free energy. The slope of the common tangent gives the equilibrium pressure of the system. C. T-V phase diagram for water and ice-1 h. D. Phase fraction of ice-1 h as a function of temperature at various system specific volumes.
Figure 4A:
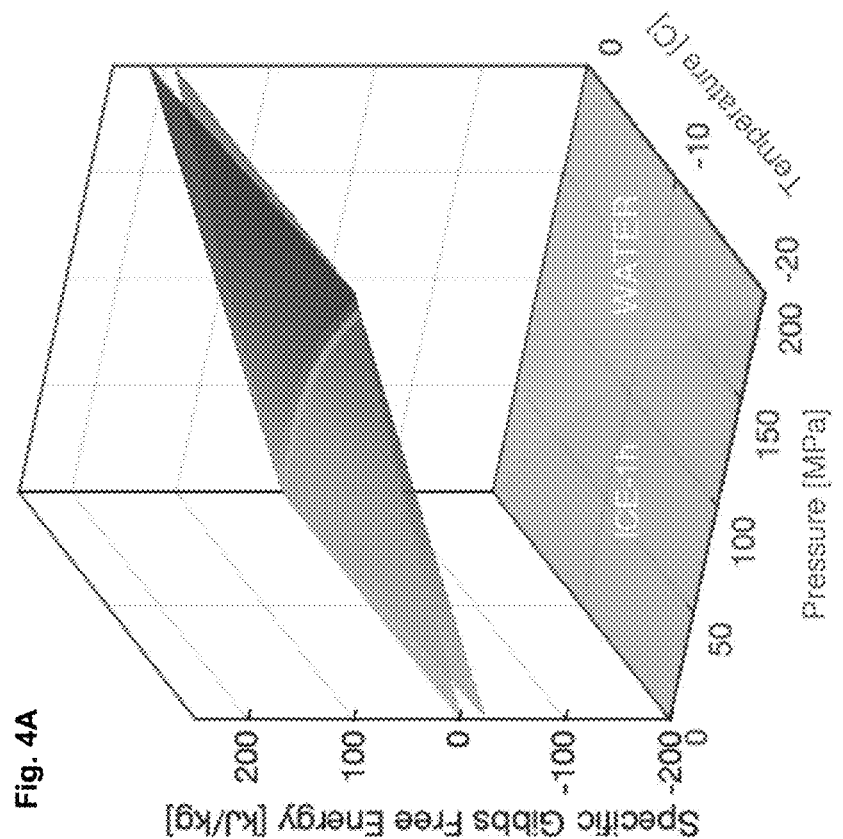
Figure 4D:
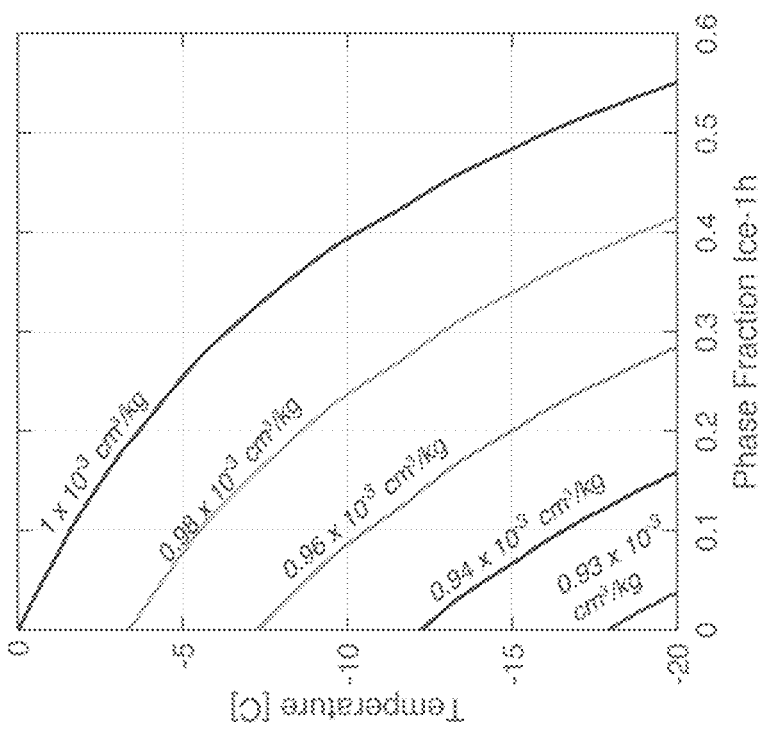
Figure 4C:
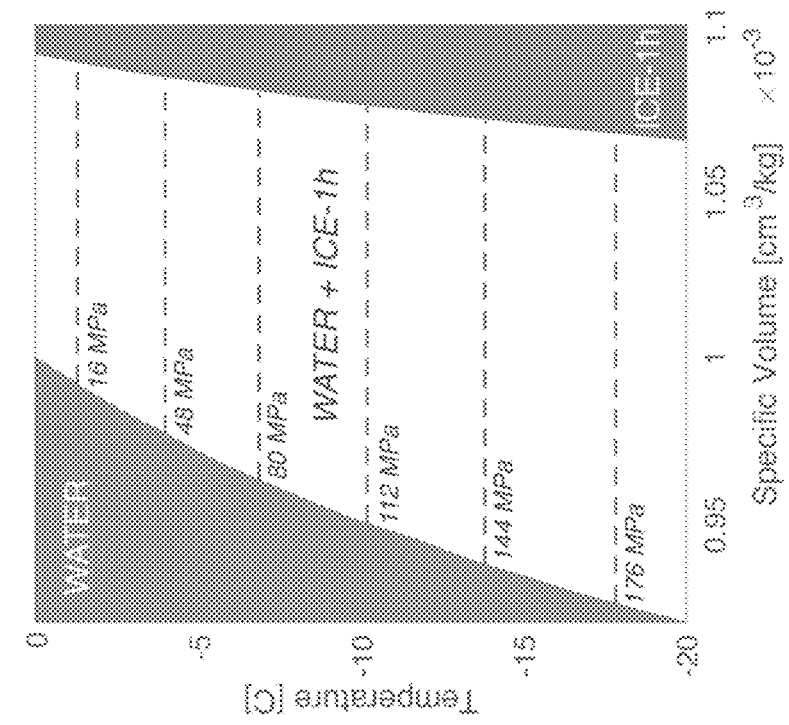

By projecting the lowest energy convex hull formed by the $F_{water}$ and $F_{ice}$ surfaces in FIG. 4B, we construct the T-V phase diagram for water, shown in FIG. 4C. To the best of our knowledge, this phase diagram has not been reported previously in the literature. The T-V phase diagram of water features a two-phase equilibrium region, where the equilibrium phase fraction can be solved using the Lever rule, in the same manner employed for T-x binary eutectic phase diagrams[28]. For the reader's reference, the phase fraction as a function of temperature and system specific volume is shown in FIG. 4D.

At a given temperature, the slope of these tangent lines, $(\partial F/\partial V)_T$, provides the pressure that the two-phase mixture exerts onto the constant-volume container. We mark these pressure isoclines on the T-V phase diagram in FIG. 4C. Note that in the equilibrium two-phase region, the tangent lines connect the water and ice-1 h free energy curves, implying that water and ice experience the same pressure, which is indeed a requirement for mechanical equilibrium.

The kinetics of ice nucleation in isochoric systems: Physical motivations

The equilibrium T-V phase diagram produced in FIG. 4C is specific-volume dependent, as the phase-coexistence regions define thermodynamic equilibrium regardless of the amount of material present. We next show that the kinetics of nucleation in isochoric systems are additionally dependent on the absolute volume of the system container, and we leverage both dependencies to derive a new isochoric theory of nucleation.

Consider the process of isochoric freezing, in which a closed, fixed-volume container filled with pure water is brought below 0° C. to a metastable supercooled state. Before ice nucleates, the supercooled water will experience some pressure $P_1$, which is given by the slope of the tangent line $\partial F_{water}/\partial v$ at the specific volume of the container, as marked on FIG. 5. When ice-1 h nucleates, the nascent nucleus will exert further pressure on the water and the container, and because the total system volume cannot change, the container will exert equal and opposite pressure back on both the water and the ice nucleus. This reduces the specific volume of ice and water, and increases their specific free energy according to the F(v) curves shown in FIG. 5. We name the energy required for this pressurization of the system and densification of the initial liquid phase the "isochoric growth penalty", which can be interpreted as an energetic penalty that the solid phase must pay in order to grow within a system of constrained absolute and specific volume.

Intuitively, the magnitude of this penalty must vary with the absolute volume of the system; growth of a single ice nucleus confined in an ocean will cause no appreciable effect, but growth of the same nucleus in a nanoscale container may compress the remaining water significantly.

Figure 5:
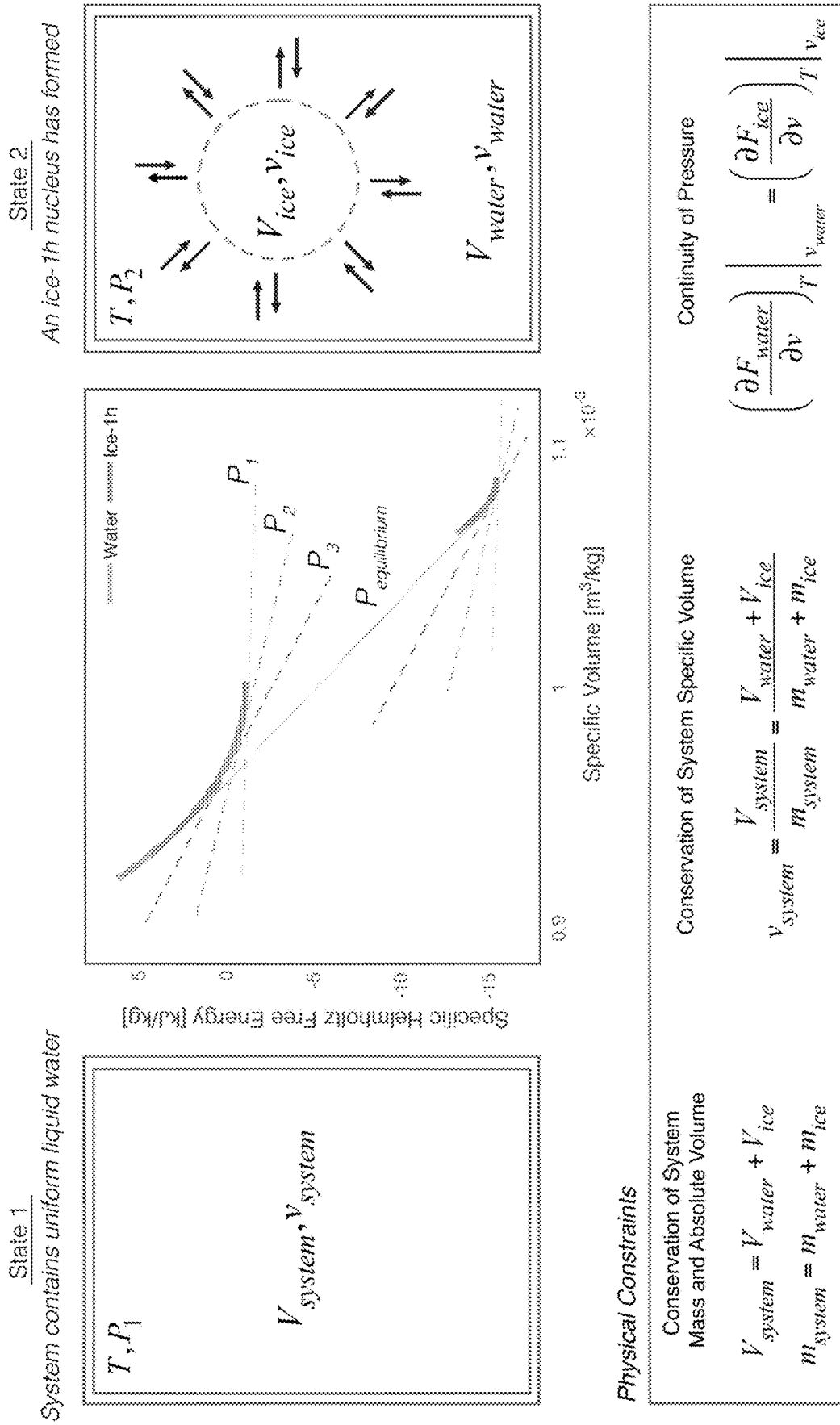
FIG. 5. Conceptual formulation of the nucleation process in an isochoric system. For an ice nucleus of absolute volume $V_{ice}$ in a system of absolute volume $V_{system}$, the specific volume and free energy of each phase can be found by identifying the points on each curve that will satisfy conservation of system mass, absolute volume, and specific volume, while producing tangent lines that are parallel to one another, indicating continuity of pressure throughout the system.

The pressure within the system is therefore a function of the relative phase fraction of ice that has grown. Because water and ice remain in constant mechanical equilibrium, the pressure experienced by both phases will be equal. Recalling that the pressure within a given phase at a given specific volume is described by the slope of the line tangent to its F(v) curve at that volume, this physical constraint can be illustrated by a "parallel tangent construction" as shown in FIG. 5, whereby the specific volumes and energies of each phase for a given phase-fraction of ice are identified by the points on the F(v) curves for water and ice that yield parallel tangents between the phases.

The use of this parallel tangent construction to track continuity of pressure between phases is analogous to the tangent construction originally used by Gibbs to describe continuity of chemical potential between phases in binary systems at constant temperature and pressure [1]. During the growth of ice in an isochoric system (and the accompanying densification of both phases), the tangent lines will remain parallel while gradually increasing in slope until the two lines merge and form the common tangent, which marks the two-phase equilibrium state shown in FIG. 4 and provides the equilibrium pressure $P_{equilibrium}$.

Mathematical Formulation of the System

In the preceding section, it was established that in an isochoric system, the specific free energies of water and ice do not remain constant during the process of nucleation and growth, instead shifting dynamically along their respective $F(v)|_T$ curves according to the parallel tangent construction. In order to mathematically describe this behavior, an expression relating the specific volumes (and thus free energies) of the phases as a function of ice nucleus growth is needed.

Given a closed isochoric system, mass and volume must be conserved $$m_{system} = m_{ice} + m_{water} \quad (1)$$

$$V_{system} = V_{ice} + V_{water} \quad (2)$$

which further implies conservation of specific volume. However, we note that the conservation of specific volume does not take the form $v_{system} = v_{ice} + v_{water}$ as might be expected, because the system specific volume is not itself an inherently conserved quantity; it is instead conserved as a simple mathematical consequence of the conservation of the system mass and volume, and is thus given by definition as:

$$v_{system} = \frac{V_{system}}{m_{system}} = \frac{V_{ice} + V_{water}}{m_{ice} + m_{water}} \quad (3)$$

The requirement of equal pressure throughout the system provides the final constraint. Leveraging the parallel tangent logic, the pressures of ice and water during the non-equilibrium nucleation process can be tracked along the F-v curves by their derivatives:

$$-\left(\frac{dF_{water}}{dv}\right)\bigg|_{v_{water}} = -\left(\frac{dF_{ice}}{dv}\right)\bigg|_{v_{ice}} \quad (4)$$

In the Supporting Information, we use these four constraints to determine the specific volumes of each phase as a function of nucleus volume ($v_{water}(V_{ice})$, $v_{water}(V_{ice})$) along the reaction coordinate of the nucleation process. These specific volumes thereby give the specific free energy for both water and ice, $F_{water}(v_{water}(V_{ice}))$, $F_{ice}(v_{ice}(V_{ice}))$ as a function of the ice nucleus volume, enabling derivation of the nucleation barrier Derivation of an Isochoric Nucleation Barrier We consider now two states that the isochoric system may occupy (FIG. 5). For clarity, we will describe the total free energy of the system with the variable Φ, and the specific Helmholtz free energies of each phase as $F_{water}$ and $F_{ice}$. The subscripts 1 and 2 will be used to denote the values of parameters in States 1 and 2.

In State 1, the entire system is in the liquid phase, and its free energy is thus given by:

$$\emptyset_1 = F_{water_1} m_{system} \quad (5)$$

in which $F_{water_1} = F_{water}(v_{water_1} = v_{system})$. In State 2, an ice-1 h nucleus of absolute volume $V_{ice}$ has formed, dividing the system into two phases with specific volumes $v_{water}(V_{ice})$ and $v_{ice}(V_{ice})$. Defining the ice phase fraction of the system as:

$$f = \frac{m_{ice}}{m_{system}} = \frac{V_{ice} v_{system}}{v_{ice} V_{system}} \quad (6)$$

and incorporating a standard interfacial free energy term γ which scales with the surface area of the ice nucleus $A_{ice}$, the total free energy of State 2 is given by:

$$\emptyset_2 = \emptyset_1 + \Delta\emptyset = [F_{water_2} \times (1-f) + F_{ice_2} \times f] m_{system} + \gamma A_{ice} \quad (7)$$

in which $F_{water_2} = F_{water}(v_{water_2} = v_{water}(V_{ice}))$ and $F_{ice_2} = F_{ice}(v_{ice_2} = v_{ice}(V_{ice}))$.

Rearranging these equations and grouping specific free energy terms by phase, the free energy change $\Delta\varnothing$ upon formation of a nucleus is given by:

$$\Delta\varnothing = \varnothing_2 - \varnothing_1 = [(F_{water_2} - F_{water_1}) + (F_{ice_2} - F_{water_2})f] m_{system} + \gamma A_{ice} \quad (8)$$

The two energy difference terms in eqn. (8) have distinct and meaningful physical significance. $(F_{water_2} - F_{water_1})$ describes the "isochoric growth penalty", or the energy required to pressurize the system and densify the water phase, which the emergent ice nucleus must provide in order to grow. This term will always be positive. $(F_{ice_2} - F_{water_2})$, which will always be negative, gives the bulk free energy difference between the phases at their present specific volumes, which is weighted by the phase fraction f in order to capture the two-phase nature of the equilibrium system.

The free energy change accompanying the formation of an ice nucleus in an isochoric system can thus be reduced to the following:

$$\Delta\varnothing = [\Delta F_{isochoric\ growth} + \Delta F_{bulk} f] m_{system} + \gamma A_{ice} \quad (9)$$

The interfacial and bulk free energy terms in eqn. (9) are roughly analogous to those found in classical nucleation theory; the former will scale with the surface area of the nucleus in the positive direction, the latter with its volume or mass in the negative. However, it is crucial to note that within the Gibbs formulation, the bulk free energy difference between water and ice is considered constant—whereas in an isochoric system, it varies as a function of the ice phase fraction, decreasing in magnitude as the ice grows in a reflection of the fact that the ultimate thermodynamic destination of the system is a state of two-phase water-ice equilibrium, not complete freezing.

The isochoric growth penalty term is unique to systems of constrained volume, and will be shown next to fundamentally alter the nucleation behavior.

Results

Figure 6B:
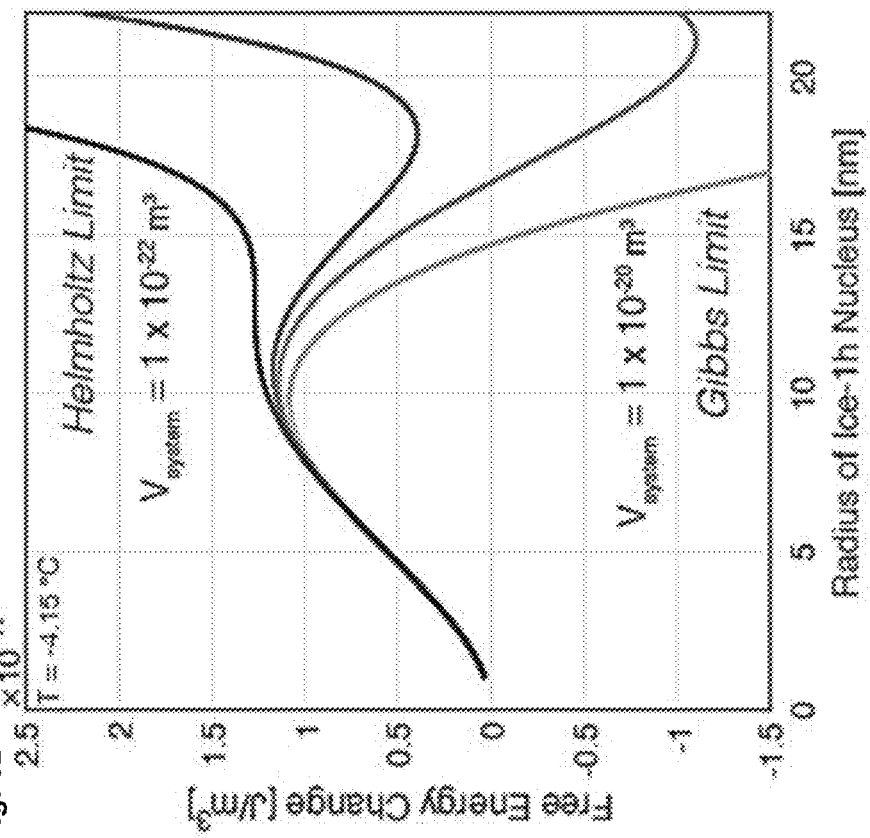
FIGS. 6A-6D. Nucleation kinetics in isochoric systems. A. Total free energy change $\Delta\Phi$ accompanying the formation of a spherical ice-1 h nucleus as a function of radius. The interfacial, isochoric growth, and bulk free energy components contributing to the total are plotted independently. B. $\Delta\Phi$ curves for varying absolute system volumes. The Gibbs Limit gives the system behavior at the limit of infinite system volume, and the Helmholtz Limit at the critical system volume at which the free energy curve begins to increase monotonically. C. Critical radius as a function of system volume for various temperatures, with critical system volumes marked. D. Phase diagram mapping the critical system volume as a function of temperature. In the kinetically dominated regime, all $\Delta\Phi$ curves will be monotonically increasing, and thus no kinetic pathway to nucleation will exist. All of these scenarios represent the formation of only a single ice nucleus; thus, in a bulk system in which millions or billions of ice nuclei are attempting to form simultaneously, it is anticipated that the inter-pressurizing effect between the various nuclei will increase nucleation barriers and decrease nucleation probabilities even at bulk volumes.
Figure 6A:
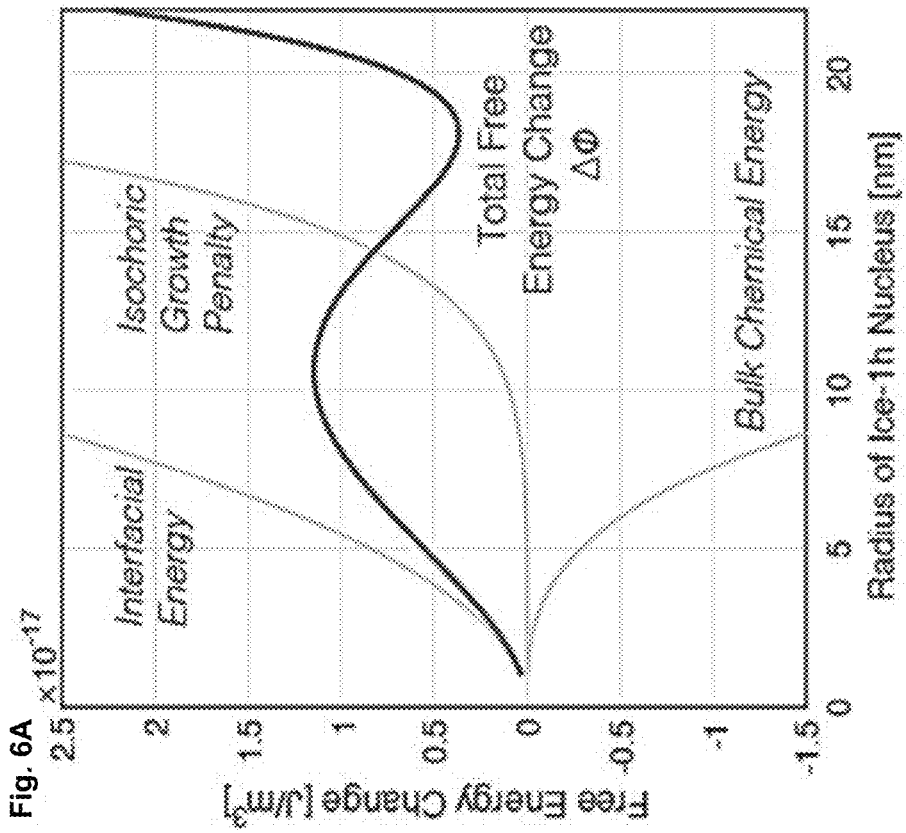

In FIG. 6A, we plot the total free energy change $\Delta\Phi$ alongside the three separate energy contributions; the interfacial energy, the bulk energy, and the isochoric growth penalty. Our calculations for FIG. 6A describe a single ice-1 h nucleus of spherical geometry in a system of absolute volume $V_S \sim 2 \times 10^{-22}$ m$^3$ at a temperature of −4.15° C. (additional parameters available in SI).

FIG. 6B features additional $\Delta\varnothing$ curves for the same temperature but varying absolute system volumes $V_s$. These plots reveal a fundamental difference between ice formation at constant volume and ice formation at constant pressure: in the classical Gibbs formulation, the $\Delta G$ (radius) curve features one critical point, while in an isochoric system there are two critical points.

Classically, the critical point of the free energy curve is a maximum and defines the nucleation barrier, or the energetic barrier after which continued ice growth will lower the free energy of the system indefinitely until the entirety has changed phase. In the isochoric case however, ice growth is not indefinite—it must cease upon reaching the equilibrium phase fraction, in accordance with the T-V phase diagram (FIG. 4C/D). This limitation is captured kinetically by the isochoric growth term, and thus the $\Delta\Phi$ curves can possess two critical points; the first a maximum at which the bulk driving force for phase transition overcomes the penalty of forming a new phase interface, and the second a minimum at which the isochoric growth energy overcomes the bulk driving force.

Importantly, because the isochoric growth term is a function of the absolute system volume (scaling as $V_{ice}/V_{sys}$), its contribution vanishes at the infinite volume limit, consistent with intuition. In this case, which we label the Gibbs Limit in FIG. 6B, the $\Delta\varnothing$ free energy curve will be identical to that found using the classical Gibbs formulation, featuring only an initial maximum.

Figure 6D:
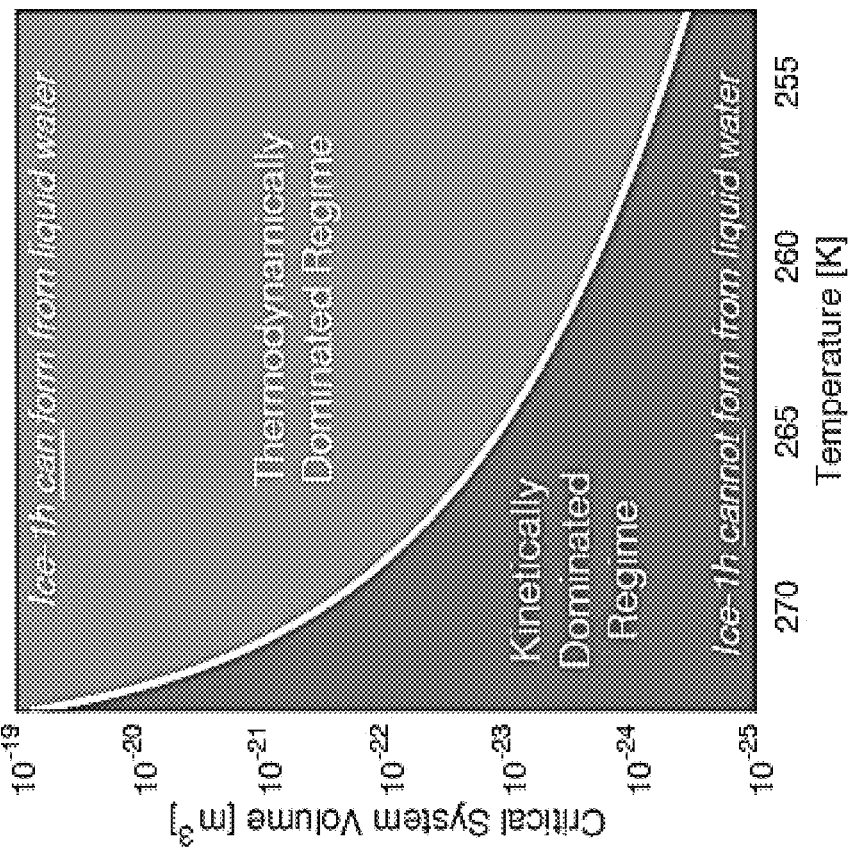
Figure 6C:
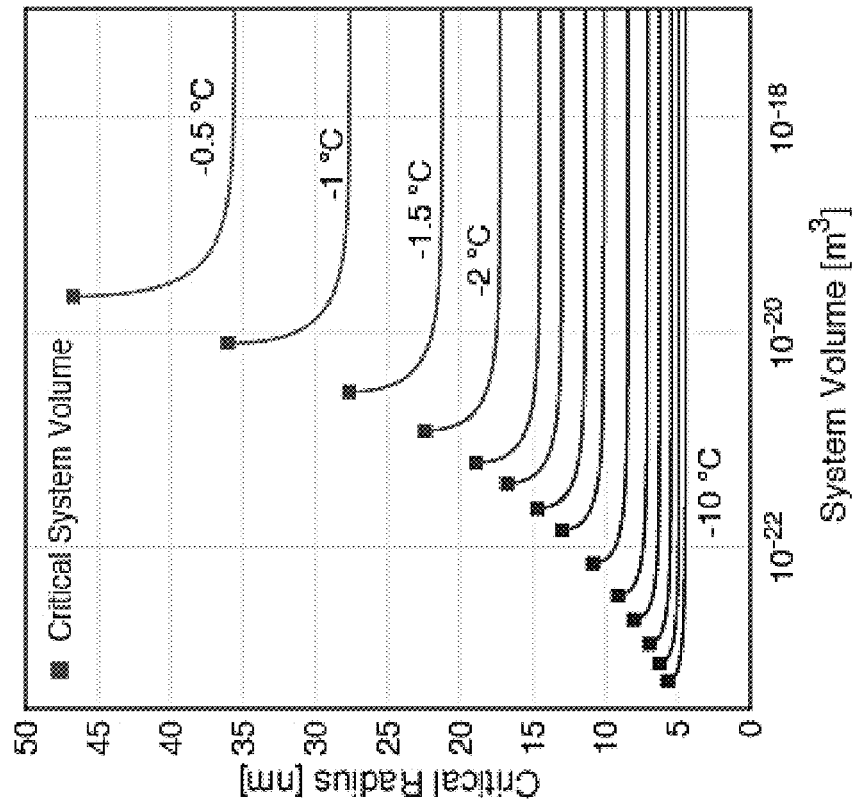
Figures 7A, 7B:
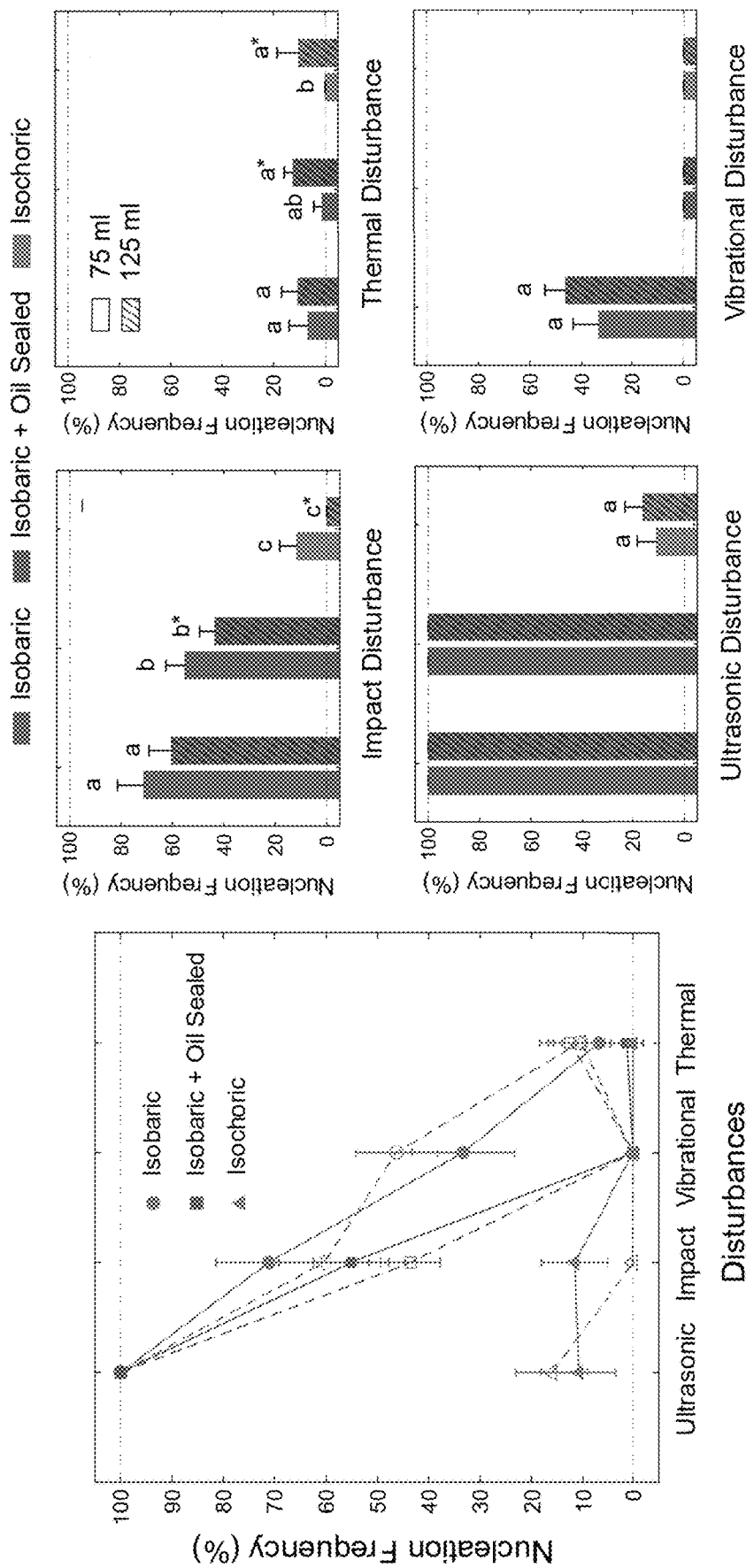
FIGS. 7A-B: Nucleation frequency upon exposure to external disturbances for conventional isobaric, isobaric oil-sealed, and isochoric systems. A. Nucleation frequency for all systems as a function of disturbance type. Solid lines and markers represent 75 ml chambers, dotted lines and hollow markers represent 125 ml chambers. B. Results for each disturbance type grouped by system type and volume. Statistically significant differences ($P<0.05$) between system types at a given volume are marked by differing letters. Significant differences between volumes of a given system type are marked by an asterisk (*). Marked values provide the mean and error bars provide the standard deviation.
Figure 10:
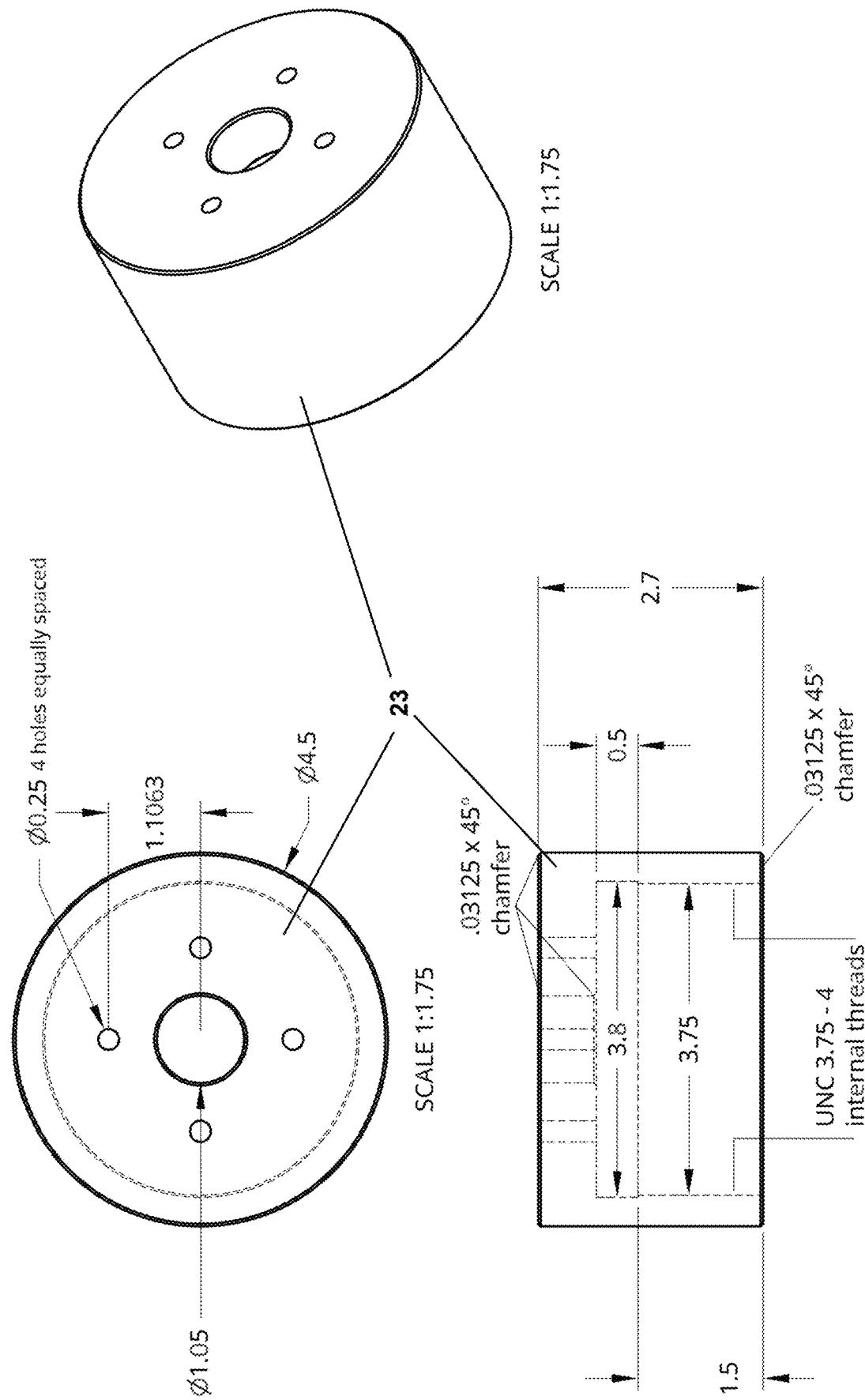
FIG. 10: Mechanical drawing of the heavy-duty cap (23) part of an optional three-part design for the base container used in principally-air-free isochoric supercooling methods and devices.
Figure 11:
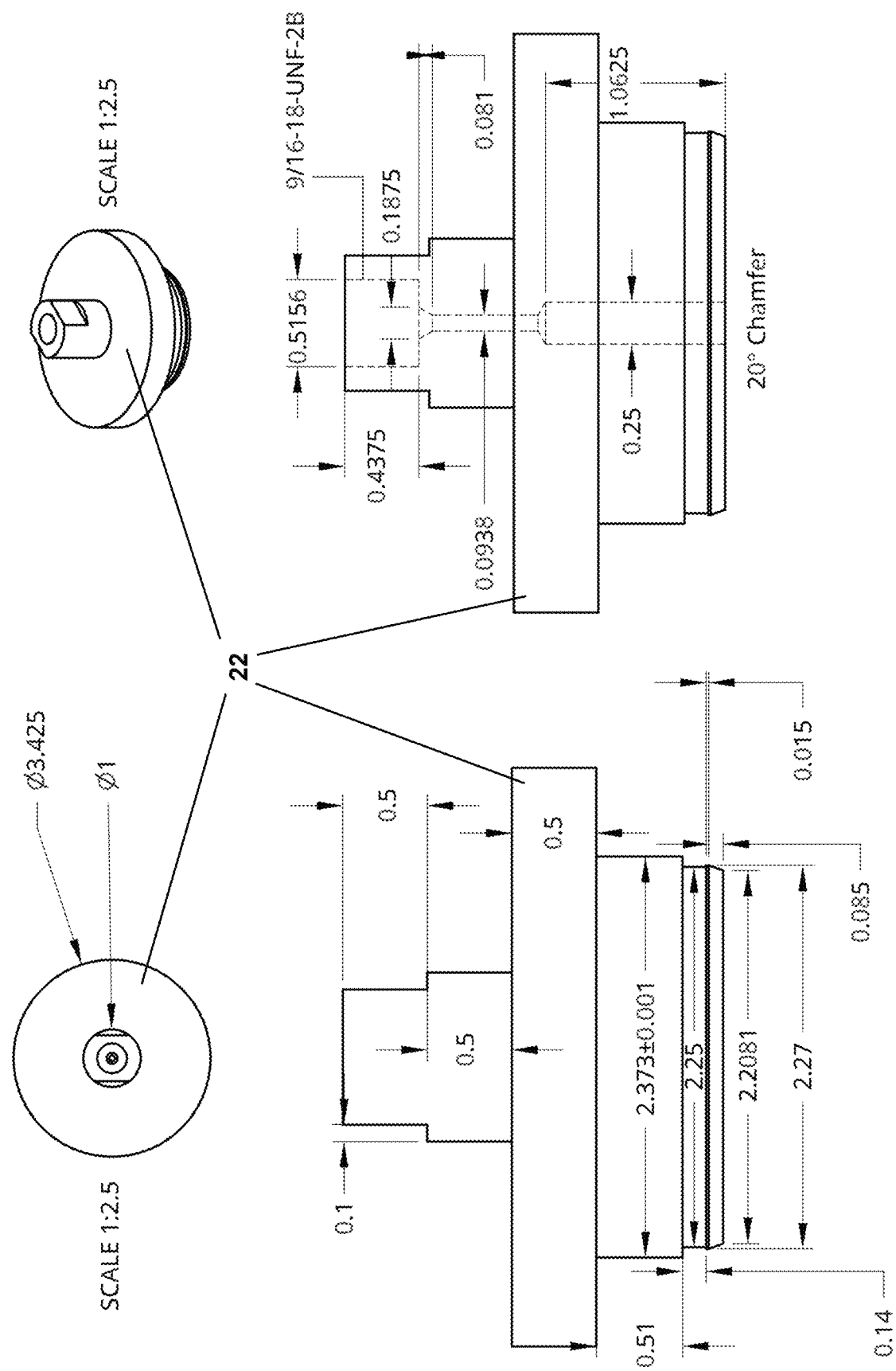
FIG. 11: Mechanical drawing of the sealing plug (22) part of an optional three-part design for the base container used in principally-air-free isochoric supercooling methods and devices.

Conversely, as the system volume decreases the relative contribution of the isochoric growth term increases, both introducing the second critical point (corresponding to the phase fraction limitation) and increasing the critical radius of the nucleation barrier. This increase is captured in FIG. 6C, given as a function of absolute system volume for various sub-freezing temperatures. Note that at temperatures close to the freezing point, the effect of the volume constraint on isochoric nucleation can be significant even under relatively large system volumes—on the order of microns.

Our derivation further reveals the existence of a discrete absolute system volume, which we term the critical confinement volume, below which the second critical point will reach an energy equal to the first, erasing the inflection point between them and yielding a nucleus free energy curve that increases monotonically with radius. A representative free energy curve at this absolute volume threshold is labeled as the Helmholtz Limit in FIG. 6B. These critical confinement volumes are also marked on the critical radius curves in FIG. 6C, indicating the system volume at which the critical radius for nucleation would become infinite. These critical system volumes are then plotted independently against temperature in FIG. 6D, resulting in a "kinetic phase diagram" for freezing water under confined volumes. Our kinetic phase diagram reveals a unique implication for systems of constant volume: there exists a volumetric regime in which nucleation of ice-1 h from the supercooled liquid state is kinetically impossible.

Notably, the existence of ice within this regime is not thermodynamically prohibited—comparing FIG. 6C with FIG. 4D it can be seen that these critical ice nucleus volumes are orders of magnitude smaller than the equilibrium phase fraction limit. These results indicate that ice could theoretically exist at these system volumes (e.g. if an ice crystal was artificially seeded in the system and the volume was then constrained), but that supercooled water simply has no kinetic pathway to freezing in a sufficiently confined isochoric system.

Discussion

The kinetic analysis provided herein only describes the formation of only the first ice-1 h nucleus in an infinitely rigid container (e.g. a container of truly constant volume), and is subject to further simplifying assumptions, including the assumption of spherical nuclei and of known interfacial energy. However, the insights revealed provide the conceptual foundations for a wide range of further study, and outline the limiting energetic behaviors of ice nuclei in isochoric systems. We anticipate that in systems that deviate from the conditions described herein, ice nucleation kinetics will lie somewhere between the identified Gibbs and Helmholtz limits. For example, systems of nanoscale volume found in biological matter may experience a reduced isochoric growth penalty due to some degree of flexibility within the container, but the excess energy required to grow in a constrained volume is still a physically pertinent feature.

Conversely, within the rigid containers described in this invention, the assumption of infinite rigidity is likely acceptable, but the macroscopic volumes are too large to appreciate the effect of a single ice nucleus. However, continuity of pressure within the system remains, forcing every growing nucleus to interact with every other via pressure, and thus a macroscopic effect on the nucleation kinetics will still be observed. This has useful implications, such as enhanced or high-stability supercooling due to heightened nucleation barriers, and ensemble-level analysis built from the single-nucleus isochoric nucleation theory must be studied in the future. In summary, regardless of the experimental details of the system, if it is operating under constant-volume conditions, the nucleation barrier equation will feature a positive isochoric growth term, increasing the energetic barrier that must be crossed in order to grow a bulk ice phase and decreasing the likelihood of initial nucleation.

Example 2. Experimental Demonstration of Ultra-High Stability Isochoric Supercooling In this example, we find that isochoric conditions and chambers can significantly improve the long term stability and ability to withstand perturbation of a supercooled solution, over other techniques for maintaining supercooling.

In this example we supercooled deionized water in identical rigid chambers under three sets of conditions:

1. Standard isobaric conditions, in which the chambers were filled to approximately 95% volume and capped, leaving a layer of air which, given its extreme compressibility, functions as an effective atmospheric pressure reservoir.

2. Oil-sealed isobaric conditions, in which chambers were similarly filled but then sealed with a 2 mm layer of mineral oil before capping, completely eliminating the air-water interface[7].

3. Principally-air-free isochoric conditions, in which chambers were assembled using a simple cap modification that enabled filling and sealing of the jars without the introduction of any air or cavities (details in Methods below) leaving a totally constrained liquid volume incapable of any manner of visible flow when turned upside down.

All systems were initially supercooled to −3±0.01° C. in a constant-temperature circulating bath and then exposed to various macroscopic perturbations, including drop-impact from a height of 1 ft onto a hard acrylic surface, 2.2 g vibrational loading on a rotary shaking table, ultrasonication in a cooled bath at 55 kHz, and continuous thermal cycling between 0 and −6 C for 24 hours (experimental details available in Methods below). Nucleation was evaluated visually, and the nucleation frequency was recorded as the number of chambers per group that experienced ice formation. All tests were conducted in n=6 trials of N=12 chambers, and repeated in two sizes (75 ml and 125 ml) of borosilicate glass media bottles with rigid threaded polypropylene caps. In order to ensure the relevance of these tests to preservation protocols of interest, which invariably involve the introduction of other potential nucleation sites into the system, a PDMS-on-glass chip was also added to each container, representative of the lab-on-a-chip systems used to house engineered tissue constructs[29].

Methods

Chamber preparation—Isobaric chambers were filled to approximately 95% volume with de-ionized water and capped, leaving a layer of air approximately 2 cm in height atop the liquid. Oil-sealed isobaric chambers were filled to the same level, then sealed via syringe with a layer of mineral oil (Sigma-Aldrich, USA) approximately 2 mm in height. As per the protocol outlined in previous studies [7] was taken to ensure that the entire water-air interface was eliminated. For assembly of isochoric chambers, a rubber plug approximately 1.5 ml in volume was press-fit into the cap of each chamber, in order to displace volume as the cap was turned onto the threads of the chamber and ensure that no air remained upon sealing of the system. After sealing, isochoric chambers were turned upside down and shaken in order to visually verify that no air remained present in the system. In all three assembly cases, DI water was chilled to 4° C. prior to filling, and the chamber was ultrasonicated after the initial pour in order to the remove any trapped air bubbles. A 3×1.5×1.5 cm PDMS-on-glass chip was also added to each system to ensure that observed effects were not products of the specific containers being employed.

Mechanical Disturbances

For all non-thermal disturbance scenarios, chambers were first supercooled to −3±0.01° C. in a programmable constant-temperature circulating chiller bath (PolyScience, USA) for four hours. They were then removed and immediately exposed to one of the following disturbances.

Impact: Chambers were dropped from a height of one foot onto a hard acrylic plate of 0.5" thickness. As per the schematic in FIG. 2A, a clear acrylic tube of slightly larger diameter than the chambers was used to ensure a straight and repeatable drop trajectory.

Vibration: Chambers were mounted to a covered rotary shaking table (ThermoFisher, USA) and shaken for 60 seconds at a rate of 500 rpm and a rotary radius of 8 mm, yielding acceleration magnitudes of approximately 2.2 g. Chambers were mounted in an insulating foam rack, and the atmosphere within the covered shaking table was maintained at −3±0.5° C. via circulation of cold $CO_2$ vapor. During initial experimental design, the temperature inside the chambers was confirmed via thermocouple to remain consistent within 0.1° C. over the 60 second shaking period.

Ultrasonication: Chambers were moved directly from the circulating chiller to an ultrasonic bath (Fisher Scientific, USA), submerged completely, and sonicated at 55 kHz for 30 seconds. The bath was filled with 10% w/v NaCl solution pre-chilled to −3° C. to ensure temperature consistency.

Thermal Disturbances

Chambers were submerged fully in the −3° C. bath directly following assembly. The chilling bath then was programmed to ramp continuously between 0° C. and −6° C. on a one hour period for 24 hours (constituting twelve cycles between the two temperatures), maintaining an average temperature of −3° C. This range was chosen to reflect the temperature oscillation encountered in standard on/off vapor-compression refrigeration units. After 24 hours, chambers were carefully removed and evaluated for ice nucleation.

In all disturbance scenarios, ice nucleation was evaluated visually, as shown in FIG. 2B, and recorded as a binary pass/fail for the purposes of calculating the nucleation frequency.

Examination of Fluid-Fluid Interfaces Under Vibration

In order to enable clear photo capture of the interface behaviors displayed in FIG. 4, alternative containers made of optically-clear virgin polystyrene with a rectilinear profile were used (T75 cell culture flask, ThermoFisher, USA). 45 ml of DI water was added to each container, with careful avoidance of air bubbles during filling. 10 ml of mineral oil was then added to one container, completely sealing the free water surface. The two chambers were then vibrated on a vertical-action vortex mixer (ThermoFisher, USA) and video of the interface behavior was captured at 1080p resolution and a speed of 30 frames-per-seconds on a Nikon D3400 camera.

Statistical Analysis

Each experimental group, defined as the chambers exposed to a given disturbance (e.g. impact, vibration, ultrasonication, thermal) at a given container volume (e.g. 75 or 125) under a given loading condition (e.g. isobaric, isobaric oil-sealed, or isochoric), was comprised of 72 chambers divided into n=6 groups of N=12 chambers. Values plotted in the results represent means, while error bars represent standard deviations. Statistically significant differences between groups were evaluated using paired-sample t-tests computed using MATLAB, with a standard significance threshold of $P<0.05$.

Experimental Results

The nucleation frequency as a function of disturbance type is plotted for all three chamber configurations in FIG. 5A, and comparisons between chamber configurations for each disturbance type are presented individually in FIG. 5B-E for statistical evaluation. As demonstrated in FIG. 5A, isochoric conditions afford greatly enhanced supercooling stability across all perturbation types, at both volume scales. Notably, isochoric supercooling at a 75 ml volume remained stable in roughly 90% of trials when exposed to ultrasonication, which is the most universal and sure-fire trigger of ice nucleation currently known [3,5,30], and remained stable in all trials when exposed to vibrational loading comparable to that encountered during commercial flight. To the best of the inventors knowledge, no technology has ever been presented that purports to be capable of resisting ultrasonic-induced nucleation in pure water, or of demonstrating this degree of stability at bulk volumes across a wide range of disturbance types. This finding demonstrates an extreme degree of stability and provides proof to our claim that isochoric conditions enable high stability supercooling. Standard isobaric conditions yielded the least stability by comparison, while oil-sealing provided statistically significant stability enhancements relative to standard isobaric conditions during exposure to macroscopic vibrational loading and acute impact, but did not significantly affect resistance to ultrasonic or thermal perturbation. As a whole, as demonstrated in FIG. 5A, isochoric supercooling provides drastically enhanced stability compared to other methods.

Discussion

Mechanical stimuli have long been known to induce ice nucleation [2], and the last century of research into the topic has clarified that cavitation is the most prominent responsible mechanism [4, 5, 8, 9]. While cavitation is frequently associated with ultrasonication, it is also caused by all manner of shockwaves [31] and by vibrational surface effects such as the Faraday instability [32], which occur at bulk fluid-fluid interfaces.

Our results obtained in this study demonstrate that isochoric supercooling is significantly more stable than its isobaric counterparts when exposed to mechanical stimuli of any kind, and we thus suggest, without wishing to be theoretically bound, that a fundamental mechanism driving this isochoric stability is a reduced likelihood of cavitation. By totally constraining the liquid volume, isochoric conditions eliminate opportunities for cavitation from effects that require bulk fluid-fluid interfaces (such as the Faraday instability or analogous effects), and eliminate opportunities for cavitation from bulk motion of the stored water. They furthermore present two thermodynamic obstacles to cavitation from shockwaves or ultrasonication: firstly, because there is no bulk air anywhere in the system, cavitation must occur in dissolved air that is first forced out of solution with the supercooled water; secondly, the formation of a low-density air bubble in a constrained volume of water will create a positive pressure, increasing its energetic barrier to formation. While theoretical analysis of this latter effect is outside the scope of this work, it is directly analogous in concept to the increased energy barriers produced by the formation of ice in a constrained volume (as described in Example 1).

In total, the superior supercooling stability experienced in isochoric systems is a composite effect, reflective of the complex thermodynamic and kinetic factors driving ice nucleation in systems of bulk volume. Thermodynamic factors such as the reduction or elimination of microscopic density fluctuations and the increase of the ice nucleation barrier under isochoric conditions contribute [33, Example 1]; the elimination of all fluid-fluid interfaces contributes [7]; and an increased overall resistance to cavitation plays a central role. The experimental reality of enhanced high-stability supercooling under isochoric conditions can be employed immediately for low-risk preservation and transportation of sensitive biological matter.

Example 3: A Base Container Design for Isochoric Supercooling Devices

In some embodiments of the system shown in schematic in FIG. 2, the base constant-volume container used to achieve high-stability isochoric supercooling may be designed as detailed in the engineering drawings featured in FIGS. 8-11. It may also be designed in any other arbitrary fashion so as to ensure rigid containment of the liquid within and effective air-sealing.

This design makes use of a two-part cap-and-plug closure to ensure robust o-ring sealing and effective optional transmission of hydrostatic pressure to a pressure transducer that can be connected via one of the 9/16-18-UNF high-pressure threaded connections.

Temperature monitoring implements, implements for the measurement of dielectric properties within the supercooled solution, or any other manner of wired or unwired probe or apparatus may be run through the secondary posterior threaded connecting port.

Each of the parts detailed in FIGS. 8-11 may be constructed of any rigid material, including metallic materials such as but not limited to Aluminum 7075, Titanium Grade 5, 316 Stainless Steel, composites such as but not limited to carbon- or glass-fiber reinforced polymers, ceramics, hard plastics, etc.

Each of the parts may additionally be treated or coated in any manner in order to achieve a variety of improving effects, including but not limited to corrosion resistance, biocompatibility, hydrophobicity, ice nucleation resistance or anti-nucleation effects, aesthetic improvement, etc.

The inventors have fabricated these devices from Aluminum 7075, Titanium Grade 5, and 316 Stainless Steel, and several combinations thereof, and have verified that this design can effectively hold seal at pressures up to 275 megapascals and temperatures as low as −196° C. when an appropriate wall thickness is chosen.

Example 4: Principally-Air-Free Isochoric Supercooling Device with Real-Time Nucleation Detection, Digital Control, and Responsive Joule Heating for Containment of Destabilization Events In some embodiments of the system shown in schematic in FIG. 2, a device configured as detailed in FIG. 12 may be employed. This device leverages high-stability isochoric supercooling to maintain a preserved media and biologic in a supercooled state, and additionally features real-time pressure-based nucleation detection to continuously monitor stability. It also features an external controller and an external Joule heating element, and employs an external cooling bath for the maintaining of the desired supercooling temperature.

In this configuration, if ice nucleation occurs for any reason, an increase in pressure will be detected by the digital pressure transducer. The digital pressure transducer transmits to a microcontroller, and if the detected pressure value surpasses an assigned threshold value (typically a small amount greater than the resting value of the system), the microcontroller will activate the heater in order to raise the temperature of the system to just above its freezing point, thereby eliminating any ice formation and allowing the system to re-supercool. The return of the pressure to its former resting value will signal to the pressure transducer that all of the ice in the system has been melted, and that the heater should be shut off and the system allowed to re-supercool.

Such a configuration was built by the inventors and experimentally validated. A custom fabricated pressure vessel built of Grade V titanium was used as the isochoric container, pressure was monitored using a digital pressure transducer, Joule heating was provided by a coiled copper wire, and control was provided by a laptop computer running MATLAB technical computing software. Pressure was plotted in real time, alongside heater activity. The employed supercooled media was pure deionized water, free of air bubbles. The entire container assembly was immersed in a constant-temperature cooling bath held at −6° C.

In FIG. 13, a sample data output generated using this device is provided. As labeled, the initial state of stable supercooling is indicated by no change in the pressure reading (solid line). Upon artificial excitation of nucleation, the pressure rises sharply, and current is sent to the relay controlling the heater (dotted line), activating the Joule heating. In this example, heat was supplied at a rate of 150 watts and no PID control was used. As heating continues, the pressure rise is arrested, and the pressure begins to decrease as the small amount of interior ice is melted. When the pressure returns to within a small percentage of its original steady value, the heater turns off. The system is then observed to re-enter a stable supercooled state at −6° C. and remain there for the remaining six hours of the experiment.

Based on the pressure and the compressibility of water and ice-1 h, it was calculated that ice inhabited approximately 5% of the container volume at the peak of its growth. Thus this example demonstrates that not only does the technology described in this enclosure enable high-stability supercooling, but in the unlikely event of destabilization and ice nucleation, pressure-based nucleation detection and responsive heating can be employed to arrest ice growth before it can overcome an appreciable portion of the container volume, thus universally protecting any stored biologics.

Also employed and pictured in this optional configuration is a secondary container for the preserved biologic. This container may have one or more flexible surfaces to allow equilibration of hydrostatic pressure between the interior contents and the surrounding environment, and may be filled with an aqueous solution which has been relieved of all or most air bubbles. An arbitrary number of biologics may be preserved in the same primary container, and in the same or separate secondary containers. The aqueous solution employed in the primary container need not be the same as employed within the secondary container. In preferred embodiments, the solution employed within the secondary container may have a lower freezing point than that within the primary container. This arrangement ensures that should the system destabilize, ice nucleation will occur in the primary container, and the biologic will thus be protected both from osmotic damage and ice damage.

Other Embodiments

It is to be understood that while the invention has been described in conjunction with the detailed description thereof, the foregoing description is intended to illustrate and not limit the scope of the invention, which is defined by the scope of the appended claims. Other aspects, advantages, and modifications are within the scope of the claims to follow.

REFERENCES

[1] Clouet, E., 2009, "Modeling of Nucleation Processes," ASM Handbook Vol. 22A, Fundamentals of Modeling for Metals Processing, D. U. Furrer, and S. L. Semiatin, eds., pp. 203-219.

[2] Young, S. W., and Van Sicklen, W. J., 1913, "The Mechanical Stimulus to Crystallization," J. Am. Chem. Soc.

[3] Luque de Castro, M. D., and Priego-Capote, F., 2007, "Ultrasound-Assisted Crystallization (Sonocrystallization)," Ultrason. Sonochem.

[4] Saclier, M., Peczalski, R., and Andrieu, J., 2010, "A Theoretical Model for Ice Primary Nucleation Induced by Acoustic Cavitation," Ultrason. Sonochem.

[5] Chow, R., Blindt, R., Chivers, R., and Povey, M., 2005, "A Study on the Primary and Secondary Nucleation of Ice by Power Ultrasound," Ultrasonics.

[6] Clouet, E., 2009, "Modeling of Nucleation Processes," Fundamentals of Modeling for Metals Processing, ASM Handbook.

[7] Huang, H., Yarmush, M. L., and Usta, O. B., 2018, "Long-Term Deep-Supercooling of Large-Volume Water and Red Cell Suspensions via Surface Sealing with Immiscible Liquids," Nat. Commun.

[8] Hickling, R., 1965, "Nucleation of Freezing by Cavity Collapse and Its Relation to Cavitation Damage," Nature.

[9] Ohsaka, K., and Trinh, E. H., 1998, "Dynamic Nucleation of Ice Induced by a Single Stable Cavitation Bubble," Appl. Phys. Lett.

[10] St John, D. H., et al., 2015, "The Contribution of Constitutional Supercooling to Nucleation and Grain Formation," Metall. Mater. Trans. A Phys. Metall. Mater. Sci.

[11] Goldsmid, H. J., 2010, "Methods for the Production of Materials," *Springer Series in Materials Science*.

[12] Hurle, D. T. J., and Rudolph, P., 2004, "A Brief History of Defect Formation, Segregation, Faceting, and Twinning in Melt-Grown Semiconductors," *Journal of Crystal Growth*.

[13] Stonehouse, G. G., and Evans, J. A., 2015, "The Use of Supercooling for Fresh Foods: A Review," J. Food Eng.

[14] Giwa, S., et al., 2017, "The Promise of Organ and Tissue Preservation to Transform Medicine," Nat. Biotechnol.

[15] de Vries, R. J., Tessier, S. N., Banik, P. D., Nagpal, S., Cronin, S. E. J., Ozer, S., Hafiz, E. O. A., van Gulik, T. M., Yarmush, M. L., Markmann, J. F., Toner, M., Yeh, H., and Uygun, K., 2019, "Supercooling Extends Preservation Time of Human Livers," Nat. Biotechnol.

[16] Berendsen, T. A., Bruinsma, B. G., Puts, C. F., Saeidi, N., Usta, O. B., Uygun, B. E., Izamis, M. L., Toner, M., Yarmush, M. L., and Uygun, K., 2014, "Supercooling Enables Long-Term Transplantation Survival Following 4 Days of Liver Preservation," Nat. Med.

[17] Taylor, M. J., Weegman, B. P., Baicu, S. C., and Giwa, S. E., 2019, "New Approaches to Cryopreservation of Cells, Tissues, and Organs," Transfus. Med. Hemotherapy.

[18] Fuller, B. J., Petrenko, A., and Guibert, E., 2019, "Human Organs Come out of the Deep Cold," Nat. Biotechnol.

[19] Akio, S., Seiji, O., Akira, T., Hiroshi, U., and Ken'ichi, T., 1992, "Fundamental Research on External Factors Affecting the Freezing of Supercooled Water," Int. J. Heat Mass Transf.

[20] Callen, H. B., and Griffiths, R. B., 1987, "Thermodynamics and an Introduction to Thermostatistics," Am. J. Phys.

[21] Rubinsky, B., Perez, P. A., and Carlson, M. E., 2005, "The Thermodynamic Principles of Isochoric Cryopreservation," Cryobiology.

[22] Alberty, R. A., 2001, "Use of Legendre Transforms in Chemiccal Thermodynamics," Pure Appl. Chem.

[23] Zia, R. K. P., Redish, E. F., and McKay, S. R., 2009, "Making Sense of the Legendre Transform," Am. J. Phys.

[24] Callen, H. B., 1998, "Thermodynamics and an Introduction to Thermostatistics, 2nd Ed.," Am. J. Phys.

[25] IAPWS, 2015 Guideline on Thermodynamic Properties of Supercooled Water.

[26] IAPWS, 2009, Revised Release on the Equation of State 2006 for H2O Ice Ih.

[27] Gibbs, J. W., 1878, "On the Equilibrium of Heterogeneous Substances.," Am. J. Sci., 96, pp. 441-458.

[28] Gordon, P., 1968, Principles of Phase Diagrams in Materials Systems, McGraw-Hill, Inc.

[29] Mathur, A., Loskill, P., Shao, K., Huebsch, N., Hong, S. G., Marcus, S. G., Marks, N., Mandegar, M., Conklin, B. R., Lee, L. P., and Healy, K. E., 2015, "Human IPSC-Based Cardiac Microphysiological System for Drug Screening Applications," Sci. Rep.

[30] Zhang, Z., Sun, D. W., Zhu, Z., and Cheng, L., 2015, "Enhancement of Crystallization Processes by Power Ultrasound: Current State-of-the-Art and Research Advances," Compr. Rev. Food Sci. Food Saf.

[31] Goyer, G. G., Bhadra, T. C., and Gitlin, S., 1965, "Shock Induced Freezing of Supercooled Water," J. Appl. Meteorol.

[32] Bazilevskii, A. V., Kalinichenko, V. A., and Rozhkov, A. N., 2018, "Effect of Fluid Viscosity on the Faraday Surface Waves," Fluid Dyn.

[33] Szobota, S. A., and Rubinsky, B., 2006, "Analysis of Isochoric Subcooling," Cryobiology, 53(1), pp. 139-142.

The invention claimed is:

1. A method of inducing stable and transportable supercooling, the method comprising:
providing a device comprising a rigid container containing biological matter in an aqueous media;
ensuring the removal of essentially all, meaning more than 99% of, bulk gas phase from the contained aqueous media;
sealing the container with a rigid air-tight closure; and
cooling the aqueous media to a temperature below 0° C. under isochoric (constant-volume) thermodynamic conditions,
wherein the container further comprises an on-board or off-board pressure sensing implement, a control implement and an energy delivery implements,
wherein pressure within the system is a function of the relative phase fraction of ice that has grown,
wherein the pressure sensing implement measures or detects pressure, wherein a change in pressure is used to detect formation or elimination of ice within the aqueous media,
wherein the energy delivery implement uses an energy delivery mechanism selected from the group consisting of conductive heating, convective heating, radiative heating, inductive heating, Joule heating, electromagnetic heating, radio heating, and ultrasonic heating,
wherein the energy delivery implement delivers energy to melt, dissolve, or otherwise eliminate ice nuclei or crystals,
wherein the pressure sensing implement comprises a digital pressure transducer, analog pressure transducer, digital pressure gauge, analog pressure gauge, electrical resistance source, piezoelectric sensor, piezospectroscopic sensor, strain gauge, optical pressure sensor, conditioned pressure sensor, or capacitive pressure sensor;
wherein the control implement comprises a computer, microprocessor, microcontroller, PID controller, or software; and
wherein the control implement continuously monitors the pressure, and activates the energy delivery implement when the pressure surpasses a given threshold value to raise the temperature of the aqueous media to eliminate ice formation, and turns off the energy delivery implement when the pressure returns to beneath the threshold value.

2. The method of claim 1, wherein the pressure sensing implement comprises a digital pressure transducer.

3. The method of claim 1, wherein the control implement comprises a PID controller.

4. The method of claim 1, further comprising a supplemental protective measure to guard against agitation, ice nucleation, damage, or desterilization, wherein:
the protective measure protects from vibration and comprises a vibration-reducing sleeve, sheath, coating, mount, container, packaging, spring, or hanger.

5. The method of claim 1, further comprising a supplemental protective measure to guard against agitation, ice nucleation, damage, or desterilization, wherein:
the protective measure protects from temperature change and comprises a thermally insulating sleeve, sheath, coating, mount, container, or packaging.

6. The method of claim 1, further comprising a supplemental protective measure to guard against agitation, ice nucleation, damage, or desterilization, wherein:
the protective measures protects from temperature change and incorporates a phase change material.

7. The method of claim 1, further comprising a supplemental protective measure to guard against agitation, ice nucleation, damage, or desterilization, wherein:
the protective measures protects from temperature change and incorporates a phase change material, that is ice, wax, aqueous solutions, or eutectic salts.

8. The method of claim 1, further comprising a supplemental protective measure to guard against agitation, ice nucleation, damage, or desterilization, wherein
the protective measure protects against heterogeneous ice nucleation at liquid-solid interfaces and comprises a surface treatment, coating, or modification made within the container or to any component which comes into contact with the aqueous media.

9. The method of claim 1, further comprising a supplemental protective measure to guard against agitation, ice nucleation, damage, or desterilization, wherein
the surface treatment, coating, or modification functions to increase the hydrophobicity or superhydrophobicity of the surface.

10. The method of claim 1, further comprising a supplemental protective measure to guard against agitation, ice nucleation, damage, or desterilization, wherein
the surface treatment, coating, or modification comprises polytetrafluoroethylene, perfluorocarbons, fluorinated silanes, fluoropolymers, calcium carbonate, zinc oxide, manganese oxide, or derivatives or combinations thereof.

11. The method of claim 1, further comprising a supplemental protective measure to guard against agitation, ice nucleation, damage, or desterilization, wherein:
the protective measure protects against corrosion, non-biocompatibility, scratching, or mechanical damage.

12. The method of claim 1, further comprising a supplemental protective measure to guard against agitation, ice nucleation, damage, or desterilization, wherein:
the protective measure comprises a surface treatment that is anodization, nickel-plating, or zinc-plating.

13. The method of claim 1, wherein the biological matter is:
an organ, that is a heart, lung, kidney, liver, spleen, pancreas, brain, bladder, stomach, intestine, ovary, penis, testicle, eye, or portions or components thereof;
a multicellular construct, that is a pancreatic islet, blood vessel, or bone marrow;
blood; or
a reproductive tissue.

14. The method of claim 1, wherein the biological matter is placed in a secondary container within the aqueous media, wherein:
the secondary container has at least one flexible surface to enable the equilibration of hydrostatic pressure between the contents of the secondary container and the surrounding aqueous media.

15. The method of claim 1, wherein the biological matter is placed in a secondary container within the aqueous media, wherein:
the secondary container is filled with an aqueous solution with an equilibrium freezing temperature lower than that of the surrounding aqueous media.

16. The method of claim 1, wherein the biological matter is placed in a secondary container within the aqueous media, wherein:
the secondary container is a bag, balloon, covered tube, or covered vial.

17. The method of claim 1, wherein the biological matter is placed in a secondary container within the aqueous media, wherein:
the secondary container has at least one flexible surface to enable the equilibration of hydrostatic pressure between the contents of the secondary container and the surrounding aqueous media;
the secondary container is filled with an aqueous solution with an equilibrium freezing temperature lower than that of the surrounding aqueous media; and
the secondary container is a bag, balloon, covered tube, or covered vial.

18. The method of claim 1, wherein the biological matter is coated, immersed, or encapsulated in a crosslinked or uncrosslinked hydrogel, preferably wherein the hydrogel is alginate, hyaluronic acid, or derivatives or combinations thereof.

19. The method of claim 1, wherein the container and aqueous media are used to facilitate chemical processes or reactions at temperatures equal to or below 0° C.

20. A device for inducing stable and transportable supercooling of aqueous media, the device comprising:
a rigid container configured to contain biological matter in an aqueous media, wherein essentially all, meaning more than 99% of, bulk gas phase from the contained aqueous media is removed;
a rigid air-tight closure for sealing the container and to maintain isochoric thermodynamic conditions within the container being configured for the aqueous media to be cooled to a temperature below 0° C. under isochoric thermodynamic conditions,
wherein the container is outfitted with an on-board or off-board pressure sensing implement, a control implement and an energy delivery implement,
wherein pressure within the system is a function of the relative phase fraction of ice that has grown,
wherein the pressure sensing implement is configured to measure or detect pressure, wherein the device is configured to detect a change in pressure indicating formation or elimination of ice within the aqueous media,
wherein the energy delivery implement used an energy delivery mechanism selected from the group consisting of conductive heating, convective heating, radiative heating, inductive heating, Joule heating, electromagnetic heating, radio heating, or ultrasonic heating,
wherein the energy delivery implement is configured to deliver energy to melt, dissolve, or otherwise eliminate ice nuclei or crystals,
wherein the pressure sensing implement comprises a digital pressure transducer, analog pressure transducer, digital pressure gauge, analog pressure gauge, electrical resistance source, piezoelectric sensor, piezospectroscopic sensor, strain gauge, optical pressure sensor, conditioned pressure sensor, or capacitive pressure sensor;
wherein the control implement comprises a computer, microprocessor, microcontroller, PID controller, or software; and
wherein the device is configured such that the control implement continuously monitors the pressure, and activates the energy delivery implement when the pressure surpasses a given threshold value to raise the temperature of the aqueous media to eliminate ice formation, and turns off the energy delivery implement when the pressure returns to beneath the threshold value.

* * * * *